United States Patent
Jagtiani et al.

(10) Patent No.: US 9,756,394 B2
(45) Date of Patent: Sep. 5, 2017

(54) SYSTEM AND METHOD OF CONTENT AND MERCHANDISE RECOMMENDATION

(71) Applicant: AT&T Intellectual Property I, L.P., Atlanta, GA (US)

(72) Inventors: Kumar H. Jagtiani, Manalapan, NJ (US); Pradeep K. Bansal, Monmouth Jn., NJ (US); Carroll W. Creswell, Basking Ridge, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 33 days.

(21) Appl. No.: 14/482,191

(22) Filed: Sep. 10, 2014

(65) Prior Publication Data

US 2014/0380346 A1    Dec. 25, 2014

Related U.S. Application Data

(63) Continuation of application No. 13/692,594, filed on Dec. 3, 2012, now Pat. No. 8,863,162.

(51) Int. Cl.
| | |
|---|---|
| *H04N 7/10* | (2006.01) |
| *H04N 21/475* | (2011.01) |
| *H04N 21/258* | (2011.01) |
| *H04N 21/466* | (2011.01) |
| *H04N 21/81* | (2011.01) |

(Continued)

(52) U.S. Cl.
CPC ... *H04N 21/4755* (2013.01); *H04N 21/25891* (2013.01); *H04N 21/4668* (2013.01); *H04N 21/4756* (2013.01); *H04N 21/44222* (2013.01); *H04N 21/4532* (2013.01); *H04N 21/6582* (2013.01); *H04N 21/812* (2013.01)

(58) Field of Classification Search
CPC ............. H04N 21/812; H04N 21/4532; H04N 21/25891; H04N 21/44222; H04N 21/6582
USPC .......................................................... 725/34
See application file for complete search history.

(56) References Cited

U.S. PATENT DOCUMENTS 5,842,200 A * 11/1998 Agrawal ................ G06Q 30/02
5,905,973 A *  5/1999 Yonezawa ........... G06F 3/04812
                                                        705/26.8

(Continued)

OTHER PUBLICATIONS

Weisstein, Eric W. "Proper Subset." From MathWorldA Wolfram Web Resource. http://mathworld.wolfram.com/ProperSubset.html.*

(Continued)

*Primary Examiner* — Michael B Pierorazio
(74) *Attorney, Agent, or Firm* — Toler Law Group, PC

(57) ABSTRACT

A method includes receiving, at a user device, first input corresponding to selection of a recommendation option of an electronic program guide. The method includes sending, from the user device to a display device, a first option to base a media content recommendation on a most recently displayed media content item and a second option to base the media content recommendation on a plurality of displayed media content items. The method includes receiving, at the user device, second input that corresponds to the first option or the second option. The method includes sending a request from the user device to a server. The request includes an identifier based on the second input. The method also includes receiving information corresponding to one or more recommended media content items at the user device in response to the request.

20 Claims, 13 Drawing Sheets

(51) Int. Cl.
*H04N 21/442* (2011.01)
*H04N 21/658* (2011.01)
*H04N 21/45* (2011.01)

(56) References Cited

U.S. PATENT DOCUMENTS

| | | | | |
|---|---|---|---|---|
| 5,909,023 A * | 6/1999 | Ono | ................... | G06Q 10/087 235/380 |
| 6,016,475 A * | 1/2000 | Miller | ............... | G06F 17/30867 705/26.7 |
| 6,029,182 A * | 2/2000 | Nehab | ............... | G06F 17/30867 707/E17.109 |
| 6,029,195 A * | 2/2000 | Herz | ................. | G06F 17/30867 348/E7.056 |
| 6,041,311 A * | 3/2000 | Chislenko | ......... | G06F 17/30699 705/26.7 |
| 6,049,777 A * | 4/2000 | Sheena | ............. | G06F 17/30699 705/26.2 |
| 6,055,513 A * | 4/2000 | Katz | ....................... | G06Q 10/02 705/14.24 |
| 6,064,980 A * | 5/2000 | Jacobi | .................... | G06Q 30/06 705/1.1 |
| 6,078,740 A * | 6/2000 | DeTreville | ............. | G06Q 30/02 703/22 |
| 6,092,049 A * | 7/2000 | Chislenko | ......... | G06F 17/30699 705/7.29 |
| 6,092,053 A * | 7/2000 | Boesch | ................ | G06Q 10/103 705/26.8 |
| 6,108,493 A * | 8/2000 | Miller | .................... | G06Q 40/08 707/999.002 |
| 6,112,186 A * | 8/2000 | Bergh | ............... | G06F 17/30699 705/14.37 |
| 6,144,964 A * | 11/2000 | Breese | .............. | G06F 17/30867 707/758 |
| 6,202,058 B1* | 3/2001 | Rose | ................ | G06F 17/30699 706/45 |
| 6,266,649 B1* | 7/2001 | Linden | ............. | G06Q 10/08345 705/14.51 |
| 6,317,722 B1* | 11/2001 | Jacobi | .................... | G06Q 30/02 705/14.51 |
| 6,321,221 B1* | 11/2001 | Bieganski | ......... | G06F 17/30699 705/26.7 |
| 6,330,592 B1* | 12/2001 | Makuch | .................. | H04L 29/06 707/999.01 |
| 6,334,127 B1* | 12/2001 | Bieganski | ......... | G06F 17/30867 |
| 6,356,879 B2* | 3/2002 | Aggarwal | ............... | G06Q 30/02 705/26.62 |
| 6,507,872 B1* | 1/2003 | Geshwind | ............... | H04L 29/06 348/E7.047 |
| 6,587,127 B1* | 7/2003 | Leeke | ................... | G06Q 20/123 715/733 |
| 6,691,163 B1* | 2/2004 | Tufts | ....................... | H04L 29/06 709/217 |
| 6,718,551 B1 | 4/2004 | Swix et al. | | |
| 6,782,370 B1* | 8/2004 | Stack | .................... | G06Q 30/02 705/26.1 |
| 6,873,967 B1* | 3/2005 | Kalagnanam | ......... | G06Q 30/02 705/26.44 |
| 7,720,723 B2* | 5/2010 | Dicker | ................... | G06Q 30/02 705/14.51 |
| 8,098,390 B1 | 1/2012 | Yacoub et al. | | |
| 8,326,690 B2* | 12/2012 | Dicker | ................... | G06Q 30/02 705/14.54 |
| 8,478,664 B1* | 7/2013 | Xavier | ................... | G06Q 30/00 705/26.1 |
| 8,752,093 B2* | 6/2014 | White | .................... | H04N 7/173 725/34 |
| 2001/0011235 A1* | 8/2001 | Kim | ................. | G06Q 10/06375 705/7.31 |
| 2001/0013009 A1* | 8/2001 | Greening | ....... | G06Q 10/063112 705/7.14 |
| 2002/0019763 A1* | 2/2002 | Linden | ................... | G06Q 30/02 705/14.53 |
| 2002/0042920 A1 | 4/2002 | Thomas et al. | | |
| 2002/0046099 A1* | 4/2002 | Frengut | .................. | G06Q 30/02 705/14.52 |
| 2002/0049637 A1* | 4/2002 | Harman | ................. | G06Q 30/02 705/26.1 |
| 2002/0052788 A1 | 5/2002 | Perkes et al. | | |
| 2002/0062249 A1 | 5/2002 | Iannacci | | |
| 2002/0144263 A1 | 10/2002 | Eldering et al. | | |
| 2003/0105682 A1* | 6/2003 | Dicker | ................... | G06Q 30/02 705/26.8 |
| 2005/0144641 A1 | 6/2005 | Lewis | | |
| 2007/0156539 A1 | 7/2007 | Yates | | |
| 2008/0235101 A1 | 9/2008 | Piepenbrink et al. | | |
| 2008/0235278 A1 | 9/2008 | Piepenbrink et al. | | |
| 2009/0187944 A1* | 7/2009 | White | ............... | H04N 21/6581 725/46 |
| 2009/0254945 A1* | 10/2009 | Kinoshita | ............... | H04L 67/02 725/60 |
| 2010/0125884 A1 | 5/2010 | Howcroft | | |
| 2010/0332313 A1 | 12/2010 | Miller et al. | | |
| 2010/0333162 A1 | 12/2010 | Lloyd et al. | | |
| 2011/0061069 A1 | 3/2011 | Arte et al. | | |
| 2011/0145848 A1* | 6/2011 | Moskowitz | ............ | H04H 60/33 725/13 |
| 2011/0153663 A1 | 6/2011 | Koren et al. | | |
| 2012/0060191 A1 | 3/2012 | Angiolillo et al. | | |
| 2012/0131475 A1* | 5/2012 | Bhogal | .................. | G06Q 10/10 715/753 |
| 2012/0174159 A1* | 7/2012 | Arte | .................... | H04N 21/2668 725/46 |
| 2012/0204201 A1 | 8/2012 | Cassidy et al. | | |
| 2012/0239504 A1 | 9/2012 | Curlander et al. | | |
| 2012/0265644 A1 | 10/2012 | Roa et al. | | |
| 2012/0296745 A1* | 11/2012 | Harper | ................... | G06Q 30/02 705/14.64 |
| 2012/0303490 A1 | 11/2012 | Hill et al. | | |
| 2012/0303491 A1 | 11/2012 | Hill | | |
| 2012/0310771 A1* | 12/2012 | Selinger | ................ | G06Q 30/02 705/26.7 |
| 2012/0330786 A1 | 12/2012 | Paleja et al. | | |
| 2012/0331494 A1 | 12/2012 | Pontual et al. | | |
| 2014/0157295 A1 | 6/2014 | Jagtiani et al. | | |

OTHER PUBLICATIONS

Weisstein, Eric W. "Subset." From MathWorldA Wolfram Web Resource. http://mathworld.wolfram.com/Subset.html.*
"Portion, n." OED Online. Oxford University Press, Sep. 2016. Web. Nov. 14, 2016.*
"Share, n.3." OED Online. Oxford University Press, Sep. 2016. Web. Nov. 14, 2016.*

* cited by examiner

SYSTEM AND METHOD OF CONTENT AND MERCHANDISE RECOMMENDATION

PRIORITY CLAIM

This application claims priority from, and is a continuation of U.S. patent application Ser. No. 13/692,594, filed on Dec. 3, 2012, which is incorporated herein by reference in its entirety.

FIELD OF THE DISCLOSURE

The present disclosure is generally related to content and merchandise recommendation.

BACKGROUND

Targeting recommendations for content or merchandise can drive sales. Additionally, targeted recommendations can improve user satisfaction when the recommendations are closely tied to the user's values or likes. Accordingly, advertisers, merchandisers, content promoters, and others frequently search for new methods of tying recommendations to desires of consumers.

DETAILED DESCRIPTION

Figure 1:
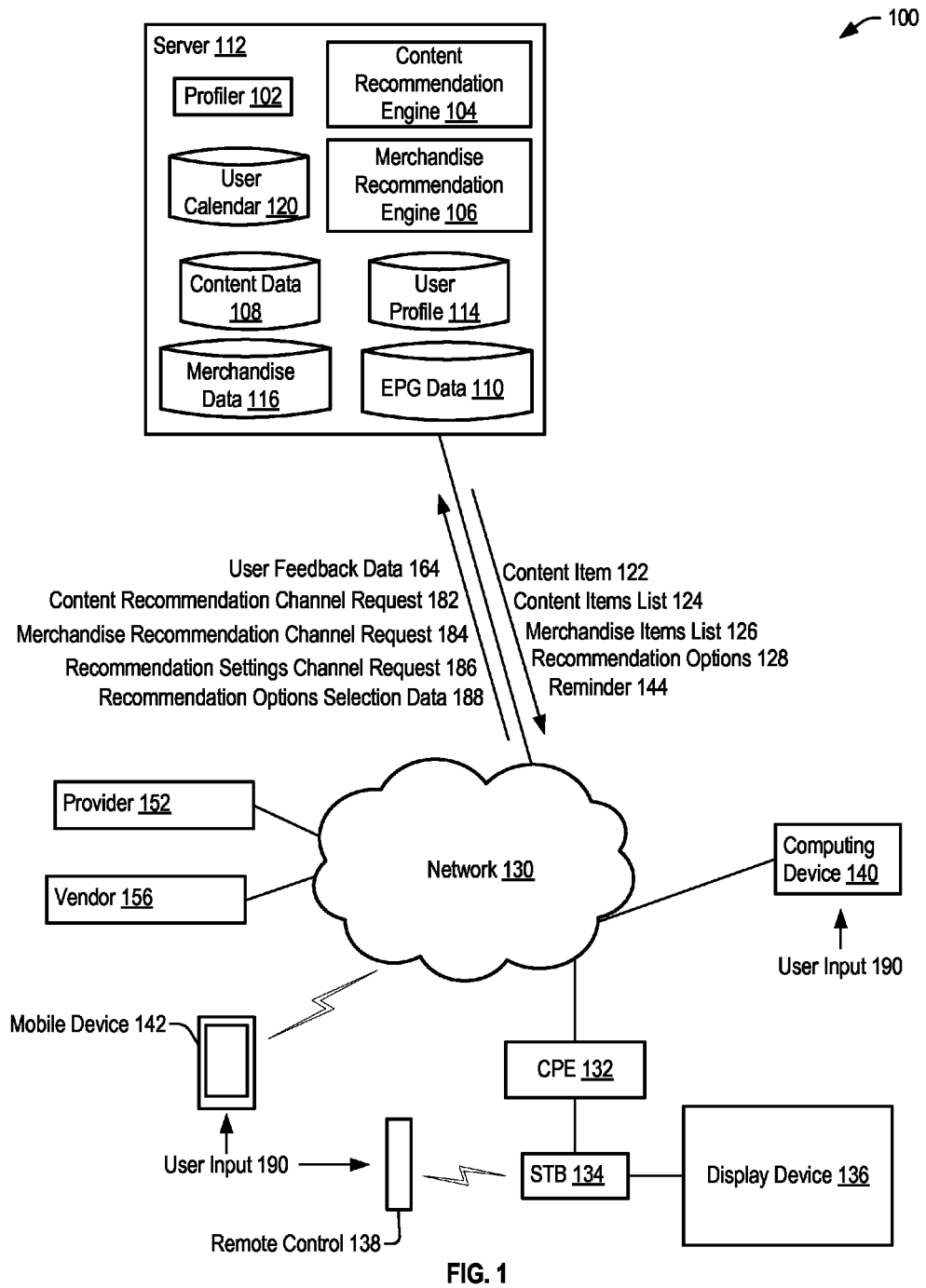
FIG. 1 is a block diagram of a particular illustrative embodiment of a system that is operable to recommend content, merchandise, or both.

A system and method of content and merchandise recommendation is disclosed. The disclosed techniques may enable a user to receive content recommendations, merchandise recommendations, or both, based on a user profile. The user profile may include filters usable to automatically select content and merchandise based on user preferences. The filters may indicate that the user has a preference for particular genres, particular actors, particular themes, etc. For example, a theme filter may indicate that the user has a preference for an animal-based theme. In this example, a content recommendation channel may be used to transmit a list of recommended movies, television shows, internet content, or a combination thereof, related to animals based on the user profile. Also in this example, a merchandise recommendation channel may be used to transmit a list of recommended tickets to animal-themed events, tickets to venues (e.g., tickets to the zoo), user items (e.g., mugs, shirts, shoes, etc.), music (e.g., downloadable or contained in physical medium), vacation packages (e.g., safari vacation packages), or a combination thereof. A recommendation settings channel may enable updating the user profile (e.g., updating filters, adding filters, removing filters, or a combination thereof).

In a particular embodiment, a method includes receiving, by a set-top box device, a user selection of an option related to a first content item and sending data to a server to enable the server to update a user profile based on the data. The data indicates the user selection. The method also includes receiving a channel selection during or after playback of the first content item. The method further includes sending a content recommendation channel request to the server in response to the channel selection corresponding to a content recommendation channel selection and receiving a list of recommended content items from the server in response to the content recommendation channel request. The list of recommended content items is based on the user profile. The method also includes sending a merchandise recommendation channel request to the server in response to the channel selection corresponding to a merchandise recommendation channel selection and receiving a list of recommended merchandise items from the server in response to the merchandise recommendation channel request. The list of recommended merchandise items is based on the user profile.

In another particular embodiment, a system includes a profiler, a content recommendation engine, and a merchandise recommendation engine. The profiler is operable to receive, from a first device, first data indicating a user selection of an option related to a first content item, where the first device is associated with a user. The profiler is also operable to update a user profile associated with the user based on the first data. The content recommendation engine is operable to generate a list of recommended content items based on the user profile and to send the list of recommended content items to the first device in response to a content recommendation channel request at the first device. The merchandise recommendation engine is operable to generate a list of recommended merchandise items based on the user profile and to send the list of recommended merchandise items to the first device in response to a merchandise recommendation channel request at the first device.

In another particular embodiment, a computer-readable storage device stores instructions that, when executed by a processor, cause the processor to perform operations including receiving, at a set-top box device, a user selection of an option related to first content and sending data to a server to enable the server to update a user profile based on the data. The data indicates the user selection. The operations also include receiving a channel selection during or after playback of the first content item. The operations further include sending a content recommendation channel request to the server in response to the channel selection corresponding to a content recommendation channel selection and receiving a list of recommended content items from the server in response to the content recommendation channel request. The list of recommended content items is based on the user profile. The operations further include sending a merchandise recommendation channel request to the server in response to the channel selection corresponding to a merchandise recommendation channel selection and receiving a list of recommended merchandise items from the server in response to the merchandise recommendation channel request. The list of recommended merchandise items is based on the user profile.

Referring to FIG. 1, a block diagram of a particular illustrative embodiment of a system that is operable to recommend content, merchandise, or both, is illustrated and is generally designated 100. The system 100 may include a server 112 communicatively coupled, via a network 130, to a mobile device 142 (e.g., a cell phone, a tablet computer, etc.), a set-top box device 134, a computing device 140 (e.g., a laptop computer, a desktop computer, etc.), or any combination thereof.

The server 112 may also be coupled, via the network 130, to one or more providers (e.g., a provider 152), one or more vendors (e.g., a vendor 156), or both. The provider 152 may include a television programming provider, an on-demand content provider, content provider, a service provider, or any combination thereof. The vendor 156 may include a retailer, a wholesaler, a website, a service provider, or a combination thereof.

As further described herein, a server (e.g., the server 112) may send a content item (e.g., a movie) to a device (e.g., the mobile device 142, the set-top box device 134, the computing device 140, or a combination thereof) associated with a user and receive feedback from the device regarding the content (e.g., an overall rating of the movie, a rating associated with a theme of the movie, ratings associated with one or more actors, etc.). The feedback may be explicit (e.g., a response to a prompt) or implicit (e.g., an observed amount of time the user watched the content item). Based on the feedback, the server may update a user profile associated with the user. For example, the server may create or update one or more filters (e.g., content rating, genre, theme, actors, etc.) that may be used to generate merchandise recommendations, content recommendations, or both.

The user may be provided access to one or more channels (e.g., television channels that enable interactive communication with the server. Upon receiving a request for a recommendation settings channel, the server may send recommendation options to the device, receive recommendation options selection data, and create or update one or more filters based on the recommendation options selection data. For example, the user may use the recommendation settings channel to update a rating of the content item. In another example, the user may use the recommendation settings channel to assign a priority to a vendor, a provider, or both. To illustrate, the user may use the recommendation settings channel to specify that merchandise recommendations should only include merchandise items of vendors with a priority above a vendor priority threshold, that content recommendations should only include content items of providers with a priority above a provider priority threshold, or both.

The server may send a list of merchandise items recommended based on the user profile (e.g., based on filters) upon receiving a request for a merchandise recommendation channel from a device associated with the user. The server may send a list of content items recommended based on the user profile (e.g., based on the filters) upon receiving a content recommendation channel request from the device.

For example, server 112 may be a network-accessible computing device, such as a server computer. The server 112 may include a profiler 102, a content recommendation engine 104, a merchandise recommendation engine 106, or any combination thereof. In a particular embodiment, the profiler 102, the content recommendation engine 104, and the merchandise recommendation engine 106 may be implemented using software (for example, instructions executable by a processor), hardware, or a combination thereof. It should be noted that in another embodiment, functionality described with reference to the profiler 102, the content recommendation engine 104, and the merchandise recommendation engine 106 may be integrated into a single module or divided into more than three modules.

The server 112 may also store or otherwise have access to a user calendar 120, content data 108, merchandise data 116, electronic program guide (EPG) data 110, a user profile 114, or any combination thereof. The EPG data 110 may include information descriptive of content items (e.g., media programs) that are accessible by the user. For example, the EPG data 110 may include information (e.g., metadata) regarding a genre, a theme, a director, a producer, captions, a language, an image format, an availability, etc. associated with a content item.

The content data 108 may include information descriptive of content items. A content item may include a media program, such as a movie, a television show, a documentary, children's programming, an internet video, etc. The information descriptive of the content items may be based on the EPG data 110. In a particular embodiment, the information descriptive of the content items may be received from provider(s) (e.g., the provider 152), from the internet (e.g., online reviews), or both. The content data 108 may also, or in the alternative, include information regarding genres, themes, actors, directors, producers, locations, costume designers, choreographers, story writers, script writers, music, captions, languages, availability (e.g., when, for how long, or both) of content, etc. The content data 108 may further include information regarding image formats (e.g., a 4:3 aspect ratio, a 16:9 aspect ratio, a 16:10 aspect ratio, a 320p resolution, a 360p resolution, a 480p resolution, a 576p resolution, a 720p resolution, a 1080p resolution, a Moving Pictures Experts Group (MPEG)-1 format, a MPEG-2 format, a MPEG-4 format, an International Telecommunication Union Telecommunication Standardization Sector (ITU-T) H.264 format, an Advanced Video Coding (AVC) format, a Third Generation Platform (3GP) format, Windows Media Video (WMV), Society of Motion Picture and Television Engineers (SMPTE), Scalable Video Coding (SVC), Flash Video (FLV), etc.).

The content data 108 may include provider information (e.g., a provider identifier, a provider priority, a provider subscription level, provider contact information, etc.). The content data 108 may include a provider priority threshold. The content data 108 may also include information regarding relationships between content items. For example, the content data 108 may indicate that users that rate a particular television show about veterinarians highly are also likely to rate a particular movie about dogs highly. In another example, the content data 108 may indicate how similar users (e.g., users belonging to a same demographic group such as age, gender, neighborhood, work, education level, or a combination thereof) have rated content.

The merchandise data 116 may include information descriptive of merchandise items. A merchandise item may include a performance ticket, a movie ticket, a venue ticket, a physical asset, an electronic asset, a reservation, a hotel reservation, a rental car reservation, a flight reservation, a vacation package, or a combination thereof. Information descriptive of merchandise items may be received from vendor(s), received from the internet, or both.

The merchandise data 116 may also include availability information, price information, location information, theme information, information regarding association with people (e.g., tickets to a charity event by a particular actor), information regarding association with content (e.g., toys associated with a particular movie), or a combination thereof.

The merchandise data 116 may further include vendor information (e.g., a vendor identifier, a vendor priority, a vendor subscription level, vendor contact information, etc.), a vendor priority threshold, or both. The merchandise data 116 may include information regarding promotions (e.g., free shipping, free next day shipping, free two day shipping, free returns, 30 day returns, 90 day returns, etc.).

The merchandise data 116 may also include information regarding relationships between content items and merchandise items. For example, the merchandise data 116 may indicate that users that rate a particular television show about veterinarians highly are also likely to buy pet food.

The user profile 114 may include information descriptive of devices associated with the user. For example, the user profile 114 may include information regarding the mobile device 142, the set-top box device 134, the computing device 140, or a combination thereof.

The user profile 114 may also include information descriptive of filters associated with the user. Examples of filters may include genres, themes, actors, directors, producers, locations, costume designers, music, captions, languages, availability, image format, content item ratings, choreographers, script writers, story writers, etc. For example, the user profile 114 may indicate that recommendations should include related content, merchandise, or both, when one or more of the filters are satisfied.

The user profile 114 may further include rating thresholds. For example, the user profile 114 may indicate that recommendations should include related content, merchandise, or both, when an associated filter value is above a rating threshold.

The user profile 114 may include a vendor priority threshold, a provider priority threshold, or both. The user profile 114 may also include a priority associated with one or more vendors, providers, or both. For example, the user profile 114 may indicate that recommendations should include content or merchandise of vendors or providers with an associated priority that satisfies a priority threshold.

The user profile 114 may further include account information of the user associated with one or more vendors, providers, or both (e.g., account identifier, username, password, etc.). The user profile 114 may include payment information (e.g., financial institution information, credit card information, bank information). The user profile 114 may further include shipping information (e.g., one or more addresses, such as work, home, relatives, friends, etc.), preferences (e.g., one day, two day, or regular), etc.

The user profile 114 may also include user preference information regarding reminders. For example, the user may prefer not to receive reminders associated with recommended content or merchandise. As another example, the user may prefer to receive reminders a particular amount of time in advance of a time of interest associated with a recommended content or a merchandise.

A time of interest associated with a content item may include a scheduled viewing time associated with the content item, a scheduled air time of the content item, a time when the content item is scheduled to become available, a time duration during which the content item is scheduled to be available, or a combination thereof. The time of interest associated with the content item may be based on the user calendar 120, the EPG data 110, the content data 108, or a combination thereof. A time of interest associated with a merchandise item may include a time when the merchandise item is scheduled to become available (e.g., for purchase, order, access, rent, lease, download, copy, etc.), a time duration during which the merchandise item is scheduled to be available, or a combination thereof. The time of interest associated with the merchandise item may be based on the user calendar 120, the merchandise data 116, or a combination thereof.

The user calendar 120 may include calendar information (e.g., a time of interest) associated with a recommended item (e.g., content or merchandise). For example, the user calendar 120 may indicate that a recommended television show is scheduled to air every week on Tuesdays starting two weeks from a current day. As another example, the user calendar 120 may indicate that tickets to a recommended show are scheduled to be available for purchase 10 days into the future.

The mobile device 142 may communicate according to one or more standards including code division multiple access (CDMA), time division multiple access (TDMA), frequency division multiple access (FDMA), orthogonal frequency division multiple access (OFDMA), single-carrier frequency division multiple access (SC-FDMA), a global system for mobile communications (GSM), enhanced data rates for GSM evolution (EDGE), evolved EDGE, Universal Mobile Telecommunications System (UMTS), Worldwide Interoperability for Microwave Access (Wi-Max), general packet radio service (GPRS), 3rd generation partnership project (3GPP), 3GPP2, 4th generation (4G), long term evolution (LTE), 4G-LTE, high speed packet access (HSPA), HSPA+, Institute of Electrical and Electronics Engineers (IEEE) 802.11x, one or more other standards, or a combination thereof.

The network 130 may include one or more networks enabling open system interconnection (OSI) layer 1 through OSI layer 7 connectivity between devices, such as a public network, private network, a service provider network, a carrier network, internet protocol television (IPTV) network, a wireless network, a radio access network, a global system for mobile communications (GSM) network, a cellular network, a third generation (3G) network, a fourth generation (4G) network, a long term evolution network (LTE), etc.

While a mobile device, a set-top box device, and a computing device are illustrated, it should be understood that the system 100 may involve communication between fewer or more than the illustrated number of electronic devices.

The set-top box device 134 may be communicatively coupled to the network 130 via customer premises equipment (CPE) 132 (e.g., a router, a residential gateway, etc.). The set-top box device 134 may also be communicatively coupled to a display device 136 (e.g., a television) and to a remote control 138. In particular embodiments, components of the system 100 may be implemented in hardware and/or as instructions executable by a processor, as further described with reference to FIG. 13.

During operation, the server 112 may send a content item 122 (e.g., a movie titled Animal Kingdom) to a device associated with the user (e.g., the mobile device 142, the set-top box device 134, the computing device 140, or a combination thereof). During or after playback of the content item 122, the user may provide feedback regarding the content item 122.

For example, the user may provide user input 190 corresponding to user feedback data 164 related to the content item 122. The user input 190 may be received by the mobile device 142, the set-top box device 134, the computing device 140, or any combination thereof. For example, the user input 190 may be received via an input interface of the mobile device 142 (e.g., a touch screen, etc.), via the remote control 138, via an input device of the computing device 140 (e.g., a keyboard, a mouse, etc.), or a combination thereof. The user feedback data 164 may be sent to the server 112 via the network 130.

The user feedback data 164 may include a content rating (e.g., a number of stars on a five star scale). To illustrate, the content rating may indicate an overall preference of the user for the content item 122. Alternatively, or in addition, the user feedback data 164 may include feedback regarding an aspect of the content. For example, such feedback may include an actor feedback (e.g., positive, negative, or neutral) associated with an actor, a theme feedback, a genre feedback, a director feedback, a producer feedback, a location feedback, a costume designer feedback, a music feedback, a caption feedback, a language feedback, a choreographer feedback, a script writer feedback, a story writer feedback, an image format feedback, or a combination thereof. A viewer feedback display may be displayed during or after playback of the content item 122. A particular example of a viewer feedback display is further described with reference to FIG. 2.

In response to the user feedback data 164, the profiler 102 may update the user profile 114. For example, the profiler 102 may add/update filters based on the user feedback data 164. The user profile 114 may include filters that reflect the most recently received feedback, filters that reflect trends (e.g., a weighted average of feedback received over time with the more recently received feedback weighted higher than earlier received feedback), or a combination thereof. For example, the profiler 102 may update the user profile 114 to indicate a content rating, actor feedback of actor(s), etc. The profiler 102 may add/update actor filters based on the actor feedback and add/update a content filter associated with the content item 122. For example, when the user feedback data 164 indicates positive actor feedback associated with a particular actor (e.g., Shyla James), the profiler 102 may add or update an actor filter associated with the actor (i.e., Shyla James) to reflect the positive feedback.

In a particular embodiment, the actor filter may represent the latest actor feedback (e.g., positive, negative, or neutral). In another embodiment, the actor filter may represent a user preference history for a particular actor, such as an average of actor feedback received over time. For example, a Shyla James actor filter may be a numerical value that represents a weighted average of actor feedback received over a particular time period with more recent actor feedback weighted higher than earlier actor feedback. To illustrate, on a Monday the server 112 may receive user feedback data 164 associated with a content item (e.g., a movie titled Twelve Days starring Shyla James) from the mobile device 142 indicating negative feedback for Shyla James, and the profiler 102 may add the Shyla James actor filter with a value corresponding to the negative feedback (e.g., a value of 0). On a following Thursday, the server 112 may receive user feedback data 164 associated with another content item (e.g., the content item 122) from the set-top box device 134 indicating positive feedback for Shyla James. In a particular embodiment, the profiler 102 may update the Shyla James actor filter to a value reflecting the most recent feedback (e.g., a value of 5). In another particular embodiment, the profiler 102 may update the Shyla James actor filter to a weighted average including assigning a lower weight to the earlier Shyla James negative feedback and a higher weight to the more recent positive feedback. In a particular embodiment, the profiler 102 may maintain both the weighted average Shyla James actor filter and the most recent Shyla James actor filter.

During or after playback of the content item 122, the user may access an electronic programming guide (EPG) display using the mobile device 142, the set-top box device 134, or the computing device 140. In a particular embodiment, the EPG display includes a merchandise recommendation channel option, a content recommendation channel option, a recommendation settings channel option, or a combination thereof. The user may select the recommendation settings channel option to receive recommendation options to create new filters or to update the existing filters. The user may select the merchandise recommendation channel option to receive a list of recommended merchandise items based on one or more filters associated with the user profile 114. The user may select the content recommendation channel option to receive a list of recommended content items based on the filters. A particular example of an EPG display is further described with reference to FIG. 3.

When the user input 190 selects the recommendation settings channel option, a recommendation settings channel request 186 may be sent to the server 112. In response to the recommendation settings channel request 186, the profiler 102 may generate recommendation options 128 based on filters associated with the user profile 114. The recommendation options 128 may indicate values of the filters associated with the user profile 114.

For example, the recommendation options 128 may include an option to update one or more of the values of the filters associated with the user profile 114, an option to remove one or more of the filters associated with the user profile 114, an option to add one or more filters associated with the user profile 114, etc. The recommendation options 128 may also include an option to specify one or more thresholds. For example, the recommendation options 128 may include an option to specify a rating threshold associated with each particular category of filter, an overall rating threshold, or both. To illustrate, the user may select an overall rating threshold to apply to all filters and also choose a particular rating threshold to apply to a particular filter category instead of the overall threshold.

The recommendation options 128 may further include an option to specify user preferences regarding reminders. For example, the recommendation options 128 may include an option to not receive reminders, an option to receive reminders a particular amount of time in advance, or both. In a particular embodiment, the recommendation options 128 may be provided to the mobile device 142, the set-top box device 134, or the computing device 140 via a recommendation settings channel. In a particular embodiment, the recommendation settings channel may be distinct from the merchandise recommendation channel, the content recommendation channel, or both. Particular examples of recommendation options are described with reference to FIG. 8.

The user may select one or more of the recommendation options 128 to generate recommendation options selection data 188 that is sent to the server 112. Based on the recommendation options selection data 188, the profiler 102 may update the user profile 114. For example, the profiler 102 may add new filter(s), update existing filter(s), remove existing filter(s), or a combination thereof, based on the recommendation options selection data 188. As another example, the profiler 102 may update user preferences associated with reminders in the user profile 114 based on the recommendation options selection data 188. Alternatively, or in addition, the profiler 102 may add new rating threshold(s), remove existing rating threshold(s), update existing rating threshold(s), or a combination thereof, based on the recommendation options selection data 188. For example, the recommendation options selection data 188 may indicate that the user has selected a particular value for a genre rating threshold. In response, the profiler 102 may add/update the genre rating threshold in the user profile 114.

When the user selects the merchandise recommendation channel option, a merchandise recommendation channel request 184 may be sent to the server 112. When the user selects the content recommendation channel option, a content recommendation channel request 182 may be sent to the server 112. In response to a recommendation channel request (e.g., the merchandise recommendation channel request 184 or the content recommendation channel request 182), the server 112 may generate a recommended items list. For example, the merchandise recommendation engine 106 may generate a merchandise items list 126 based on the user profile 114 and the merchandise data 116 in response to the merchandise recommendation channel request 184. Particular examples of recommended merchandise items that may be included in the merchandise items list 126 are described with reference to FIG. 6. As another example, the content recommendation engine 104 may generate a content items list 124 based on the user profile 114 and the content data 108 in response to the content recommendation channel request 182. Particular examples of recommended content items that may be included in the content items list 124 are described with reference to FIG. 7.

To generate the recommended items list (e.g., the merchandise items list 126 or the content items list 124), the server 112 may include items that satisfy filters of the user profile 114. For example, the merchandise recommendation engine 106 may include merchandise item(s) in the merchandise items list 126 that satisfy filters of the user profile 114 based on merchandise data 116. As another example, the content recommendation engine 104 may include content item(s) in the content items list 124 that satisfy filters of the user profile 114 based on the content data 108.

To illustrate, a filter (e.g., a Shyla James actor filter) of the user profile 114 may have a particular filter value (e.g., 5). The user profile 114 may include a rating threshold (e.g., an actor rating threshold) with a particular threshold value (e.g., 3). Based on the particular filter value (i.e., 5) satisfying the particular rating threshold (i.e., 3), the merchandise recommendation engine 106 may include merchandise item(s) satisfying the filter (e.g., merchandise items associated with the actor Shyla James) in the merchandise items list 126 based on the merchandise data 116. The content recommendation engine 104 may include content item(s) satisfying the filter in the content items list 124 based on content data 108.

The server 112 may provide the recommended items list (i.e., the merchandise items list 126 or the content items list 124) to the mobile device 142, the set-top box device 134, or the computing device 140. In a particular embodiment, the merchandise items list 126 may be provided via a merchandise recommendation channel and the content items list 124 may be provided via a content recommendation channel. In a particular embodiment, the content recommendation channel may be distinct from the merchandise recommendation channel.

In a particular embodiment, the user may select one or more of the recommended items (e.g., merchandise items or content items). The recommended item selection may be sent to the server 112. In a particular embodiment, the server 112 may automatically order a selected recommended item from an associated vendor (or provider) based on the user profile 114. For example, the server 112 may order a selected recommended item based on the user's vendor (or provider) account information in the user profile 114.

The server 112 may also, or in the alternative, provide vendor (or provider) information to a device associated with the user (e.g., the mobile device 142, the set-top box device 134, the computing device 140, or a combination thereof). For example, the server 112 may provide a vendor (or provider) identifier, vendor (or provider) contact information, vendor (or provider) location, etc. The server 112 may also, or in the alternative, provide information to the vendor (or provider) regarding the user, may automatically establish communication between a device associated with the user (e.g., the mobile device 142, the set-top box device 134, or the computing device 140) and the vendor (or provider), may perform other operations in response to the recommended merchandise selections, or a combination thereof.

In a particular embodiment, the server 112 may generate the recommended items list (e.g., the merchandise items list 126 or the content items list 124) based on a "full" version of the user profile 114 in response to determining that the recommendation channel request (e.g., the merchandise recommendation channel request 184 or the content recommendation channel request 182) indicates a selection of a full profile recommendation option (e.g., a full profile merchandise option or a full profile content option).

The server 112 may generate the recommended items list (i.e., the merchandise items list 126 or the content items list 124) based on a "partial" version of the user profile 114 in response to determining that the recommendation channel request (i.e., the merchandise recommendation channel request 184 or the content recommendation channel request 182) indicates a selection of a partial profile recommendation option (e.g., a partial profile merchandise option or a partial profile content option).

The mobile device 142, the set-top box device 134, or the computing device 140 may send recommendation options (e.g., the partial profile merchandise recommendation option, the full profile merchandise recommendation option, the partial profile content recommendation option, the full profile content recommendation option, or a combination thereof) to a display in response to the selection of the recommendation channel option (e.g., the merchandise recommendation channel option or the content recommendation channel option). Particular examples of merchandise options are described with reference to FIG. 4. Particular examples of content options are described with reference to FIG. 5.

In a particular embodiment, the server 112 may maintain a "partial" version of the user profile 114 and a "full" version of the user profile 114. The "partial" version of the user profile 114 may be based on a single content item (e.g., the content item 122). The "full" version of the user profile 114 may be based on multiple content items, including the content item that the partial version of the user profile 114 is based on. For example, the partial version of the user profile 114 may be based on user feedback data 164 associated with a single content item, such as a content item most recently played back at a device associated with the user, a content item most recently sent to the device, or both. The full version of the user profile 114 may be based on the content item that the partial version of the user profile 114 is based on in addition to other content items.

For example, the user feedback data 164 associated with the content item 122 may indicate positive feedback associated with a particular actor, whereas a weighted average actor filter associated with the particular actor may indicate a neutral value. The weighted average actor filter may be based on user feedback data 164 associated with the content item 122 and based on previously received user feedback data. To illustrate, the full version of the user profile 114 may include the weighted average Shyla James actor filter, whereas the partial version of the user profile 114 may include the most recent Shyla James actor filter based on the user feedback data 164 associated with a single content item.

In response to determining that the recommendation channel request (i.e., the merchandise recommendation channel request 184 or the content recommendation channel request 182) indicates a selection of the full profile recommendation option (i.e., the full profile merchandise recommendation option or the full profile content recommendation option), the server 112 may include items in the recommended items list (e.g., the merchandise items list 126 or the content items list 124) that are associated with the particular actor when the weighted average actor filter value satisfies the actor rating threshold. On the other hand, in response to determining that the recommendation channel request (i.e., the merchandise recommendation channel request 184 or the content recommendation channel request 182) indicates a selection of the partial profile recommendation option (i.e., the partial profile merchandise recommendation option or the partial profile content recommendation option), the server 112 may include items (e.g., merchandise or content) associated with the particular actor when the actor filter based on the single user feedback data satisfies the actor rating threshold.

In a particular embodiment, the server 112 may send a reminder 144 related to a recommended item (e.g., merchandise or content) to one or more devices associated with the user (e.g., the mobile device 142, the set-top box device 134, the computing device 140, or a combination thereof) based on the user calendar 120. The server 112 (e.g., the merchandise recommendation engine 106 or the content recommendation engine 104) may update the user calendar 120 to include date information associated with the recommended items list (e.g., the merchandise items list 126, the content items list 124, or both) and may generate the reminder 144 based on the date information. For example, item data (e.g., the merchandise data 116 or the content data 108) may indicate an associated time of interest (e.g., a start date of a promotion) of a particular item. The server 112 may add information regarding the time of interest in the user calendar 120 upon including the particular item in the recommended items list (e.g., the merchandise items list 126, the content items list 124, or both).

In a particular embodiment, the reminder 144 may be sent by the server 112 (e.g., by the content recommendation engine 104 or by the merchandise recommendation engine) a particular amount of time in advance of a time of interest based on a user preference regarding reminders indicated in the user profile 114. For example, the user preference may indicate whether reminders are to be sent, how far in advance of a time of interest reminders are to be sent, or both.

In a particular embodiment, the server 112 (e.g., the merchandise recommendation engine 106 or the content recommendation engine 104) may include items in the recommended items list (e.g., the merchandise items list 126 or the content items list 124) based, at least in part, on a priority of an associated vendor or provider satisfying a priority threshold. For example, the merchandise recommendation engine 106 may include merchandise items in the merchandise items list 126 when an associated vendor priority indicated by the merchandise data 116 satisfies a vendor priority threshold indicated by the user profile 114, when an associated vendor priority indicated by the user profile 114 satisfies a vendor priority threshold indicated by the user profile 114, or both. As another example, the content recommendation engine 104 may include content items in the content items list 124 when an associated provider priority indicated by the content data 108 satisfies a provider priority threshold indicated by the user profile 114, when an associated provider priority indicated by the user profile 114 satisfies a provider priority threshold indicated by the user profile 114, or both.

In a particular embodiment, a priority (e.g., of a vendor or of a provider) may be determined dynamically. For example, the priority may be determined based on a subscription level (e.g., of the vendor or of the provider), based on a promotion (e.g., offered by the vendor or by the provider), or both. To illustrate, the item data (e.g., the merchandise data 116, the content data 108, the user profile 114, or a combination thereof) may indicate that vendors (or providers) associated with a premium subscription have a higher priority than others. As another example, the item data (e.g., the merchandise data 116, the content data 108, the user profile 114, or a combination thereof) may indicate that vendors (or providers) offering a particular promotion have a higher priority than others. In a particular embodiment, the priority (e.g., of a vendor or of a provider) may be static. For example, item data (e.g., the merchandise data 116, the content data 108, the user profile 114, or a combination thereof) may indicate that a particular vendor (or a particular provider) has a specific priority (e.g., highest, lowest, medium, 5 out of 10, etc.).

In a particular embodiment, the user may specify that the dynamic vendor priority of a particular vendor may be determined by modifying a static vendor priority of the particular vendor. For example, the user may specify that the static vendor priority of a particular vendor may be increased or decreased (e.g., by a particular ratio or amount) based on whether the particular vendor offers a particular promotion. In a particular embodiment, the priority indicated by the item data may be based on the recommendation options selection data 188.

In a particular embodiment, the merchandise recommendation engine 106 may ignore the dynamic priority of a particular vendor when the user has also specified a static priority for that particular vendor. For example, the merchandise data 116 (or the user profile 114 or both) may indicate a dynamic vendor priority for vendors that offer a particular promotion, and the particular vendor may offer the particular promotion. However, the merchandise data 116 (or the user profile 114 or both) may also include a static vendor priority of the particular vendor. The merchandise recommendation engine 106 may ignore the dynamic vendor priority in favor of the static vendor priority for the particular vendor.

In a particular embodiment, the server 112 may arrange or sort items in the recommended items list (e.g., merchandise items list 126 or the content items list 124) based on the associated priority (e.g., of a vendor or of a provider) indicated by the item data (e.g., the merchandise data 116, the content data 108, the user profile 114, or a combination thereof). For example, the merchandise recommendation engine 106 may arrange or sort the merchandise items list 126 such that merchandise items associated with a vendor having a higher priority (e.g., based on the merchandise data 116, the user profile 114, or both) have a higher position in the merchandise items list 126 than merchandise items associated with a vendor having a lower priority. As another example, the content recommendation engine 104 may arrange or sort the content items list 124 such that content items associated with a provider having a higher priority (e.g., based on the content data 108, the user profile 114, or both) have a higher position in the content items list 124 than content items associated with a provider having a lower priority.

The system 100 may thus enable automatic content recommendation, merchandise recommendation, or both, based on user feedback regarding content. The system 100 may be used to recommend content, merchandise, or both, based on a full version of a user profile or a partial version of the user profile. The user may modify the recommendation settings (e.g., filters, thresholds, etc.). The recommendations may be arranged or sorted based on a provider priority, vendor priority, or both. The priority may be specified by the user or may be automatically determined (e.g., based on a vendor subscription level, a vendor promotion, a provider subscription level, a provider promotion, or a combination thereof).

Figure 2:
FIG. 2 is a diagram to illustrate a particular example of viewer feedback display of the system of FIG. 1.

Referring to FIG. 2, a diagram of a particular example of a viewer feedback display of the system of FIG. 1 is illustrated and is generally designated 200. In the illustrative embodiment illustrated in FIG. 2, a content rating 204 and an actor feedback (e.g., 208, 210, or 212) associated with each of one or more actors may be selected via the viewer feedback display 200. In other embodiments, other rating options may be provided via the viewer feedback display 200.

The viewer feedback display 200 may include options to provide feedback regarding a content item 122 during or after play back of the content item 122. As illustrated in FIG. 2, the viewer feedback display 200 includes an option to select the content rating 204 associated with the content item 122 (e.g., a movie titled Animal Kingdom) based on a 5 star scale. The viewer feedback display 200 also includes a positive feedback option (e.g., 208), a negative feedback option (e.g., 210), and a neutral feedback option (e.g., 212) associated with each of a plurality of actors (e.g., Nathan Adams, Shyla James, Tammona nasi, and Quinton Tumay). The viewer feedback display 200 includes a submit option 214 to initiate sending data (e.g., the user feedback data 164 of FIG. 1) regarding the selected options to the server 112 and a cancel option 216 to exit the viewer feedback display.

In a particular embodiment, the viewer feedback display 200 may be displayed at one or more devices (e.g., the mobile device 142, the set-top box device 134, the computing device 140, or a combination thereof) associated with a user after or during playback of the content item 122. The user input 190 of FIG. 1 may indicate selections of options displayed by the viewer feedback display 200. For example, the user input 190 may indicate a selection of the content rating 204 to indicate a preference for the content item 122 (e.g., the user may select 5 stars to indicate a high preference or may select 1 star to indicate a low preference for Animal Kingdom). The user may select negative actor feedback 210 associated with an actor (e.g., Nathan Adams) to indicate a low preference for the actor, a positive actor feedback 208 associated with the actor to indicate a high preference for the actor, or a neutral actor feedback 212 to indicate a medium preference for the actor. The user may select the submit option 214 to initiate sending user feedback data 164 indicating the user selections to the server 112. The profiler 102 may update the user profile 114 based on the user feedback data 164, as described with reference to FIG. 1.

Figure 3:
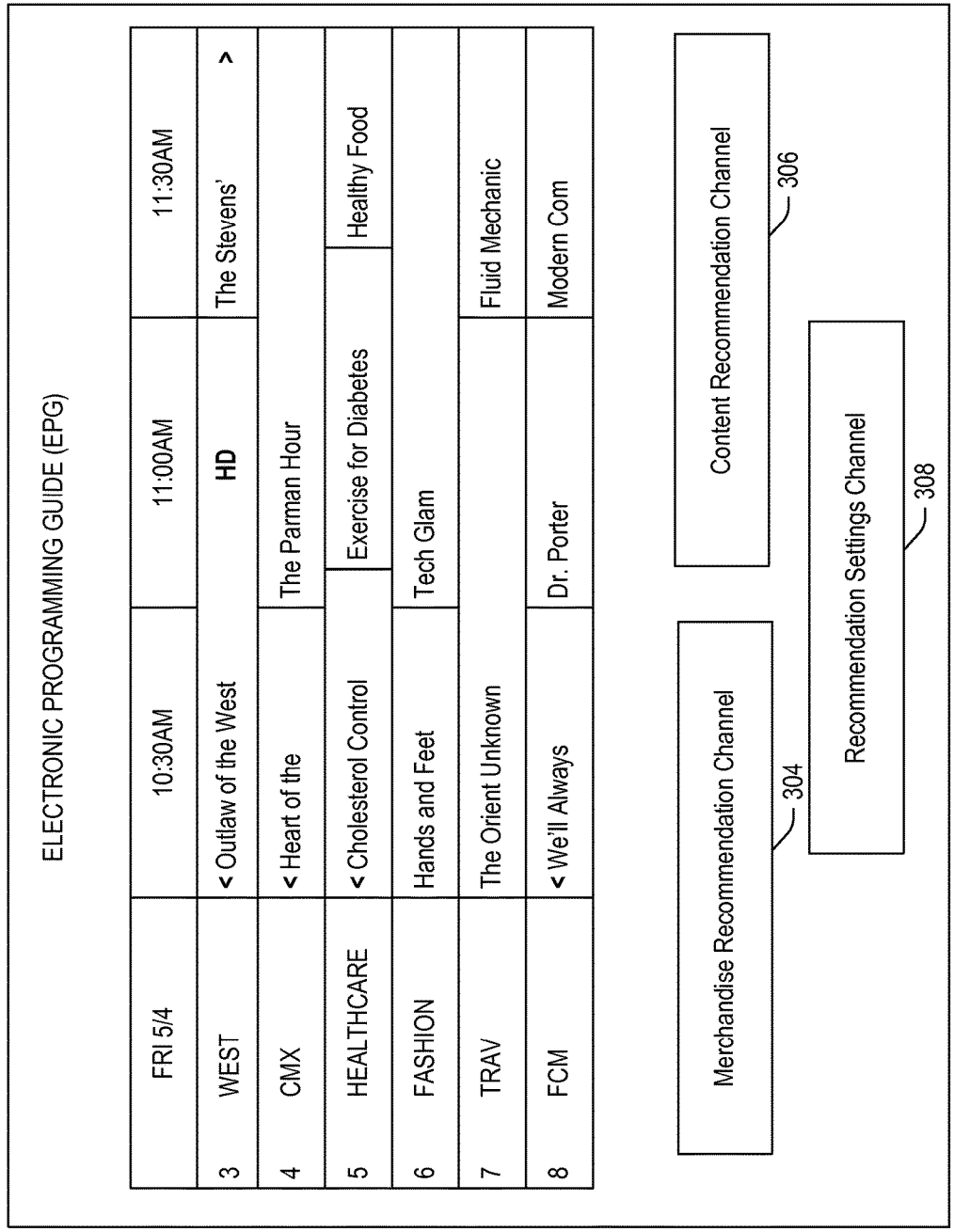
FIG. 3 is a diagram to illustrate a particular example of an electronic program guide (EPG) display of the system of FIG. 1.

Referring to FIG. 3, a diagram of a particular example of an electronic program guide (EPG) display of the system of FIG. 1 is illustrated and is generally designated as 300. In an illustrative embodiment, a merchandise recommendation channel, a content recommendation channel, or a recommendation settings channel may be selected via the EPG display 300.

The EPG display 300 includes a merchandise recommendation channel option 304, a content recommendation channel option 306, and a recommendation settings channel option 308. The EPG display 300 may be displayed at a device (e.g., the mobile device 142, the set-top box device 134, or the computing device 140) associated with the user. When the user selects the merchandise recommendation channel option 304, the device (i.e., the mobile device 142, the set-top box device 134, or the computing device 140) may send the merchandise recommendation channel request 184 of FIG. 1 to the server 112. In response to the merchandise recommendation channel request 184, the merchandise recommendation engine 106 may generate and send the merchandise items list 126 to the device, as described with reference to FIG. 1.

When the user selects the content recommendation channel option 306, the device (i.e., the mobile device 142, the set-top box device 134, or the computing device 140) may send the content recommendation channel request 182 to the server 112. In response to the content recommendation channel request 182, the content recommendation engine 104 may generate and send the content items list 124 to the device, as described with reference to FIG. 1.

When the user selects the recommendation settings channel option 308, the device (i.e., the mobile device 142, the set-top box device 134, or the computing device 140) may send the recommendation settings channel request 186 to the server 112. In response, the profiler 102 may generate and send the recommendation options 128 to the device, as described with reference to FIG. 1.

Figure 4:
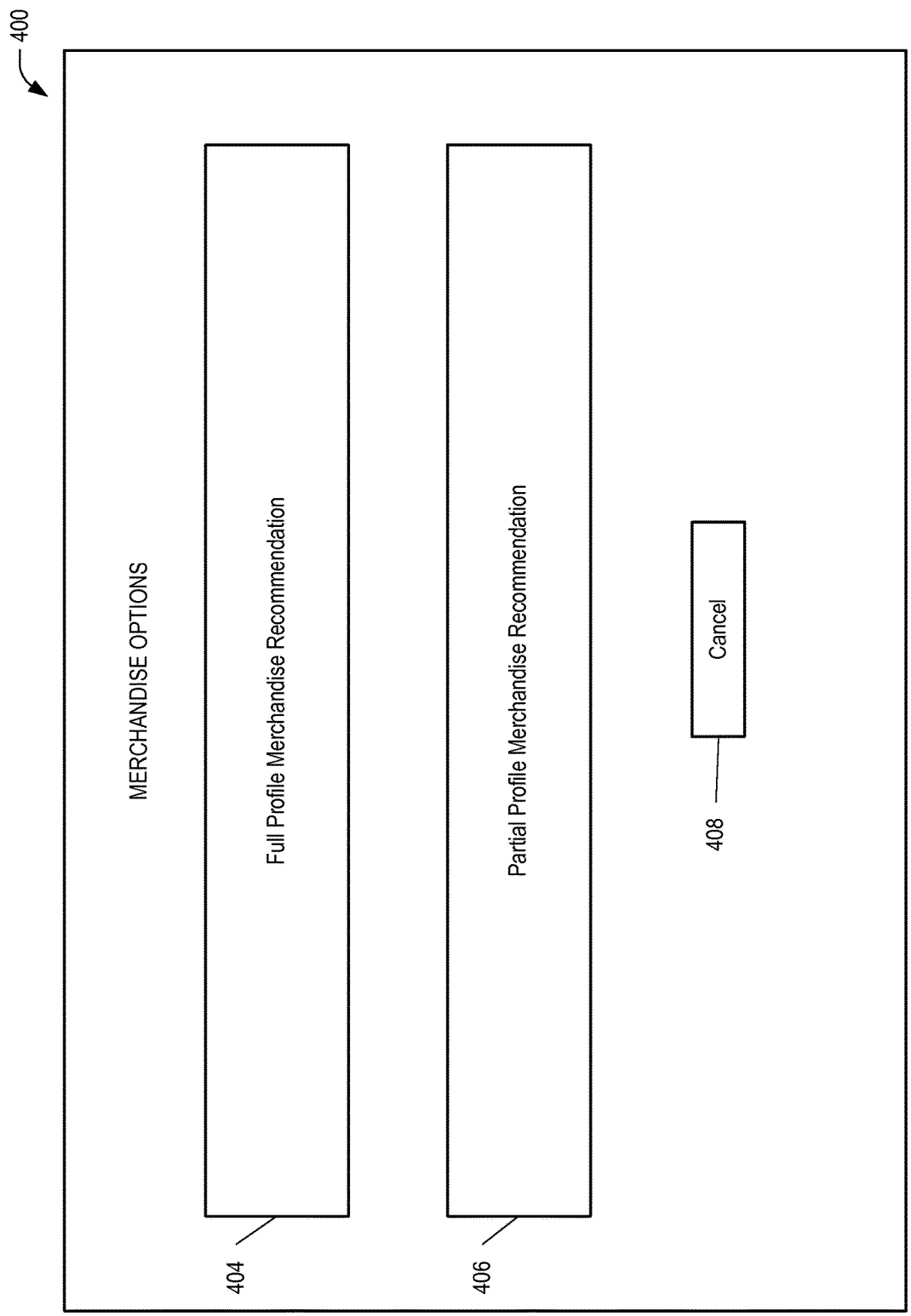
FIG. 4 is a diagram to illustrate a particular example of a merchandise options display of the system of FIG. 1.

Referring to FIG. 4, a diagram of a particular example of a merchandise options display of the system of FIG. 1 is illustrated and is generally designated 400. In an illustrative embodiment, a user may select an option to receive merchandise recommendations based on a full version of a user profile or an option to receive merchandise recommendations based on a partial version of the user profile via the merchandise options display 400.

The merchandise options display 400 includes a full profile merchandise recommendation option 404 and a partial profile merchandise recommendation option 406. The merchandise options display 400 also includes a cancel option 408 to exit the merchandise options display. The merchandise options display 400 may be displayed at a device (e.g., the mobile device 142, the set-top box device 134, or the computing device 140) in response to a selection of the merchandise recommendation channel option 304 of FIG. 3.

The merchandise recommendation channel request 184 of FIG. 1 may indicate the merchandise option selection (e.g., a selection of the full profile merchandise recommendation option 404 or a selection of the partial profile merchandise recommendation option 406). In response to the merchandise recommendation channel request 184 indicating a selection of the full profile merchandise recommendation option 404, the merchandise recommendation engine 106 may generate a merchandise items list 126 based on a full version of the user profile 114, as described with reference to FIG. 1. In response to the merchandise recommendation channel request 184 indicating a selection of the partial profile merchandise recommendation option 406, the merchandise recommendation engine 106 may generate a merchandise items list 126 based on a partial version of the user profile 114, as described with reference to FIG. 1. The merchandise recommendation engine 106 may send the merchandise items list 126 to the device (i.e., the mobile device 142, the set-top box device 134, or the computing device 140).

Figure 5:
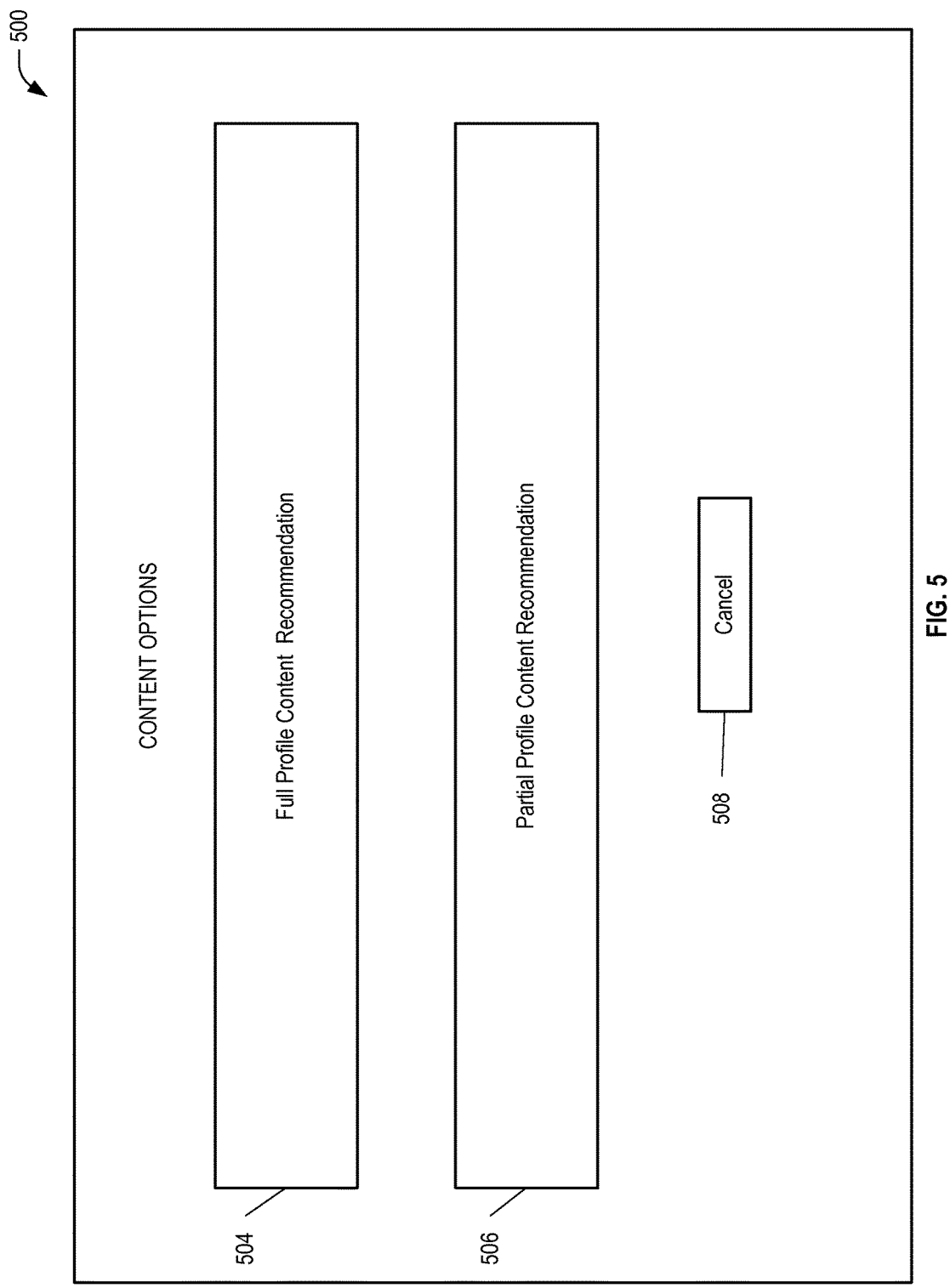
FIG. 5 is a diagram to illustrate a particular example of a content options display of the system of FIG. 1.

Referring to FIG. 5, a diagram of a particular example of a content options display of the system of FIG. 1 is illustrated and is generally designated 500. In an illustrative embodiment, a user may select an option to receive content recommendations based on a full version of a user profile or an option to receive content recommendations based on a partial version of the user profile via the content options display 500.

The content options display 500 includes a full profile content recommendation option 504 and a partial profile content recommendation option 506. The content options display 500 also includes a cancel option 508 to exit the content options display. The content options display 500 may be displayed at a device (e.g., the mobile device 142, the set-top box device 134, or the computing device 140) in response to a selection of the content recommendation channel option 306 of FIG. 3.

The content recommendation channel request 182 of FIG. 1 may indicate the content option selection (e.g., a selection of the full profile content recommendation option 504 or a selection of the partial profile content recommendation option 506). In response to the content recommendation channel request 182 indicating a selection of the full profile content recommendation option 504, the content recommendation engine 104 may generate a content items list 124 based on a full version of the user profile 114, as described with reference to FIG. 1. In response to the content recommendation channel request 182 indicating a selection of the partial profile content recommendation option 506, the content recommendation engine 104 may generate a content items list 124 based on a partial version of the user profile 114, as described with reference to FIG. 1. The content recommendation engine 104 may send the content items list 124 to the device (i.e., the mobile device 142, the set-top box device 134, or the computing device 140).

Figure 6:
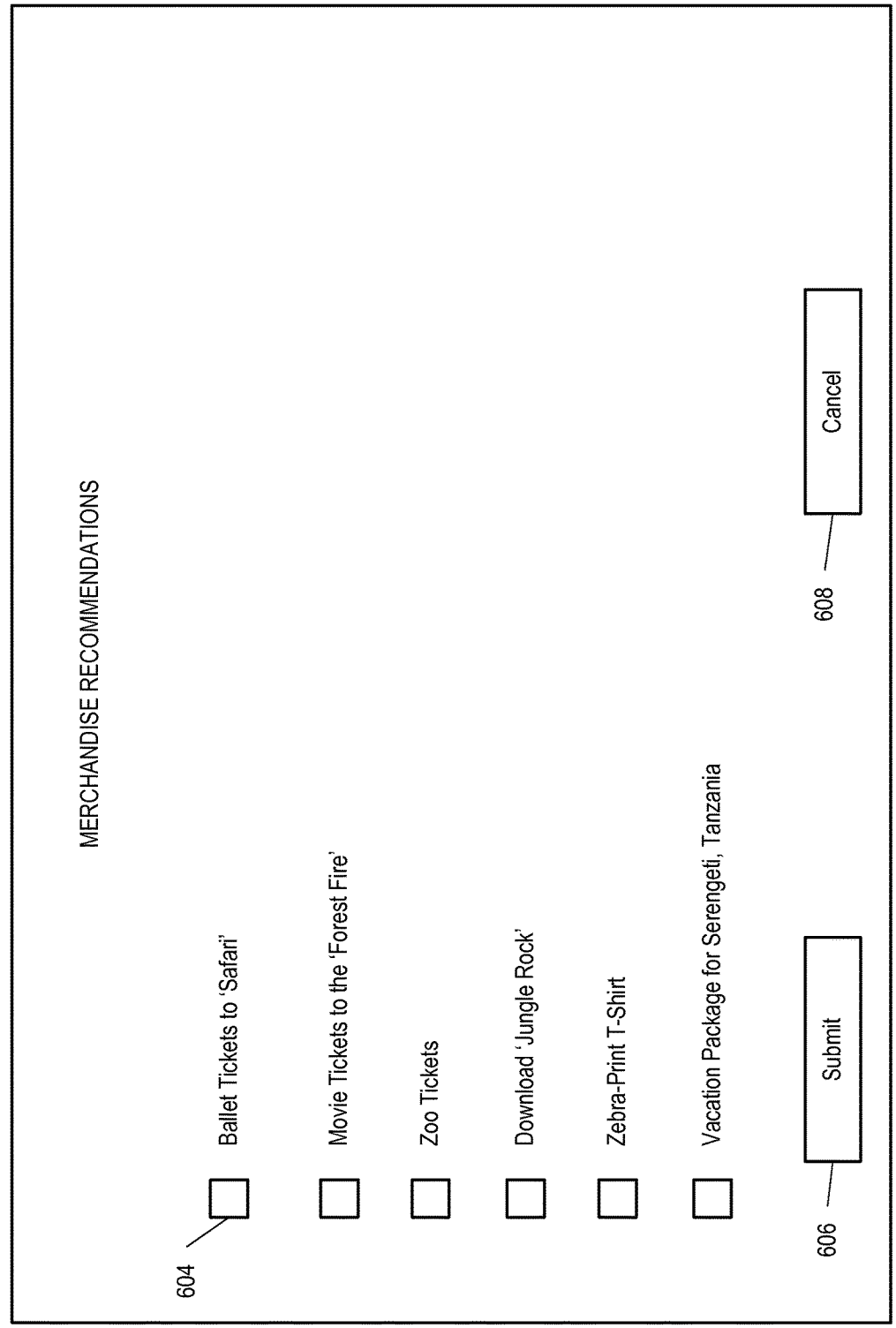
FIG. 6 is a diagram to illustrate a particular example of a merchandise recommendations display of the system of FIG. 1.

Referring to FIG. 6, a diagram of a particular example of a merchandise recommendations display of the system of FIG. 1 is illustrated and is generally designated 600. In an illustrative embodiment, the merchandise recommendations display 600 may include one or more recommended merchandise items.

As illustrated in FIG. 6, the merchandise recommendations display 600 includes a list identifying a plurality of recommended merchandise items and a selectable option 604 associated with each of the recommended merchandise items. In the specific example illustrated in FIG. 6, the recommended merchandise items include tickets to a ballet titled Safari, tickets to a movie titled Forest Fire, tickets to the zoo, a downloadable song titled Jungle Rock, a zebra-print t-shirt, and a vacation package to Serengeti, Tanzania. The merchandise recommendations display 600 includes a cancel option 608 to exit the merchandise recommendations display. The user may select one or more of the selectable options 604 and select a submit option 606.

In a particular embodiment, the user input 190 may correspond to a selection of one or more of the recommended merchandise items of the merchandise recommendations display 600. The recommended merchandise item selection may be sent to the server 112. In a particular embodiment, the server 112 may automatically order a selected recommended merchandise item from an associated vendor based on the user profile 114 (e.g., based on the user's account information corresponding to the vendor). The server 112 may provide vendor information (e.g., a vendor identifier, vendor contact information, vendor location, etc.) to a device associated with the user (e.g., the mobile device 142, the set-top box device 134, the computing device 140, or a combination thereof). The server 112 may provide information to the vendor regarding the user, may automatically establish communication between a device associated with the user (e.g., the mobile device 142, the set-top box device 134, or the computing device 140) and the vendor, may perform other operations in response to the recommended merchandise selections, or a combination thereof.

Figure 7:
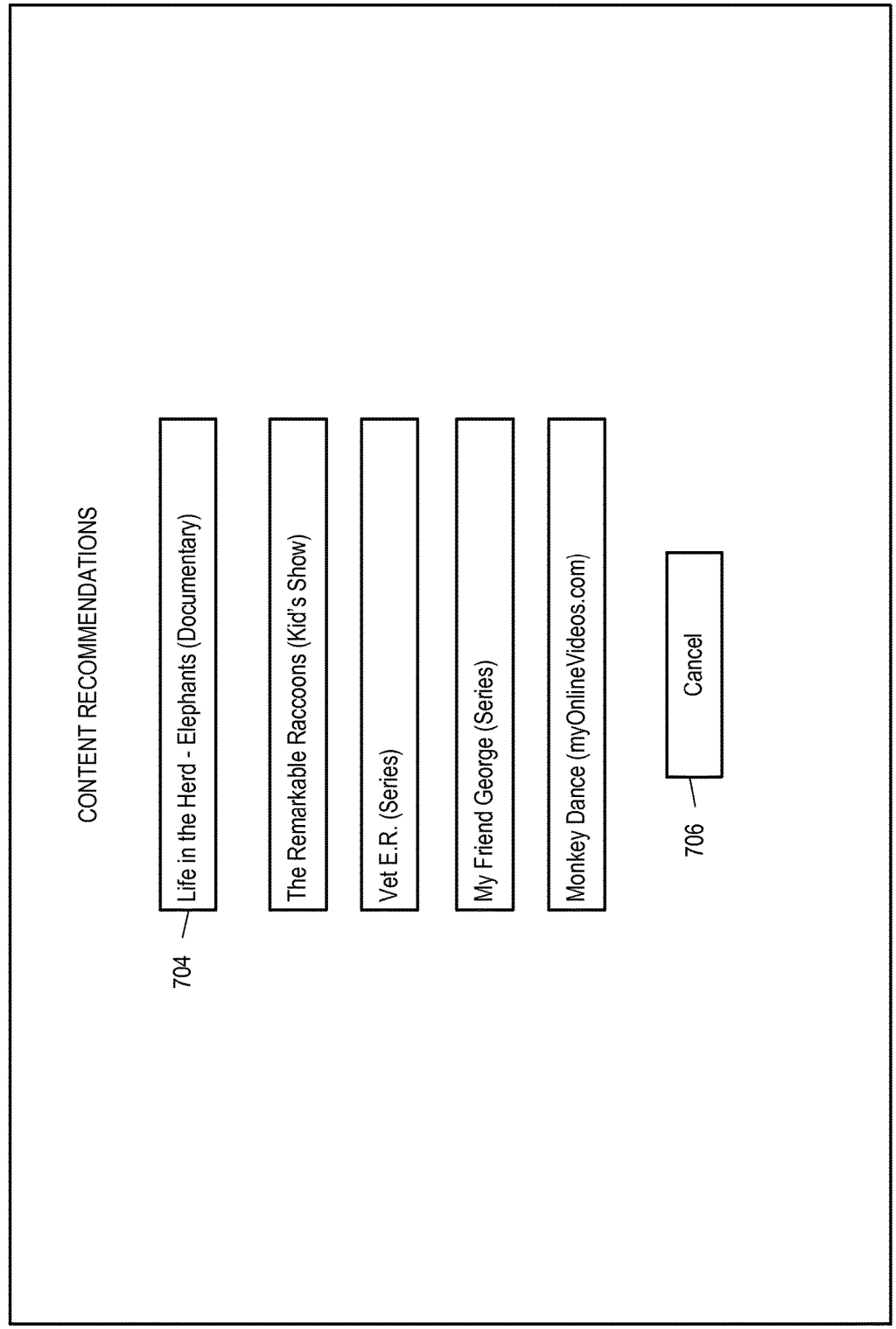
FIG. 7 is a diagram to illustrate a particular example of a content recommendations display of the system of FIG. 1.

Referring to FIG. 7, a diagram of a particular example of a content recommendations display of the system of FIG. 1 is illustrated and is generally designated 700. In an illustrative embodiment, the content recommendations display 700 may include one or more recommended content items.

As illustrated in FIG. 7, the content recommendations display 700 includes a list identifying a plurality of recommended content items and a selectable option 704 associated with each of the recommended content items. In the specific example illustrated in FIG. 7, the recommended content items include a documentary titled Life in the Herd—Elephants, a kids' show titled The Remarkable Raccoons, a television series titled Vet E.R., an online series titled My Friend George, and an online video titled Monkey Dance. The content recommendations display 700 includes a cancel option 706 to exit the content recommendations display. The user may select one or more of the selectable options 704.

In a particular embodiment, the user input 190 may correspond to a selection of a recommended content item of the content recommendations display 700. The recommended content item selection may be sent to the server 112. In a particular embodiment, the server 112 may provide the selected recommended content item to a device associated with the user (e.g., the mobile device 142, the set-top box device 134, the computing device 140, or a combination thereof), may schedule a viewing of the selected recommended content item, may record the selected content item, or a combination thereof. The server 112 may automatically order one or more of the selected recommended items from an associated provider based on the user profile 114 (e.g., based on the user's account information corresponding to the provider). The server 112 may provide information (e.g., provider contact information, provider location, etc.) regarding the provider to a device associated with the user (e.g., the mobile device 142, the set-top box device 134, the computing device 140, or a combination thereof. The server 112 may provide information to the provider(s) regarding the user, may automatically establish communication between a device associated with the user (e.g., the mobile device 142, the set-top box device 134, or the computing device 140) and the provider, may perform other operations in response to the recommended content selection, or a combination thereof. In a particular embodiment, multiple recommended content items may be selectable via the content recommendations display.

Figure 8:
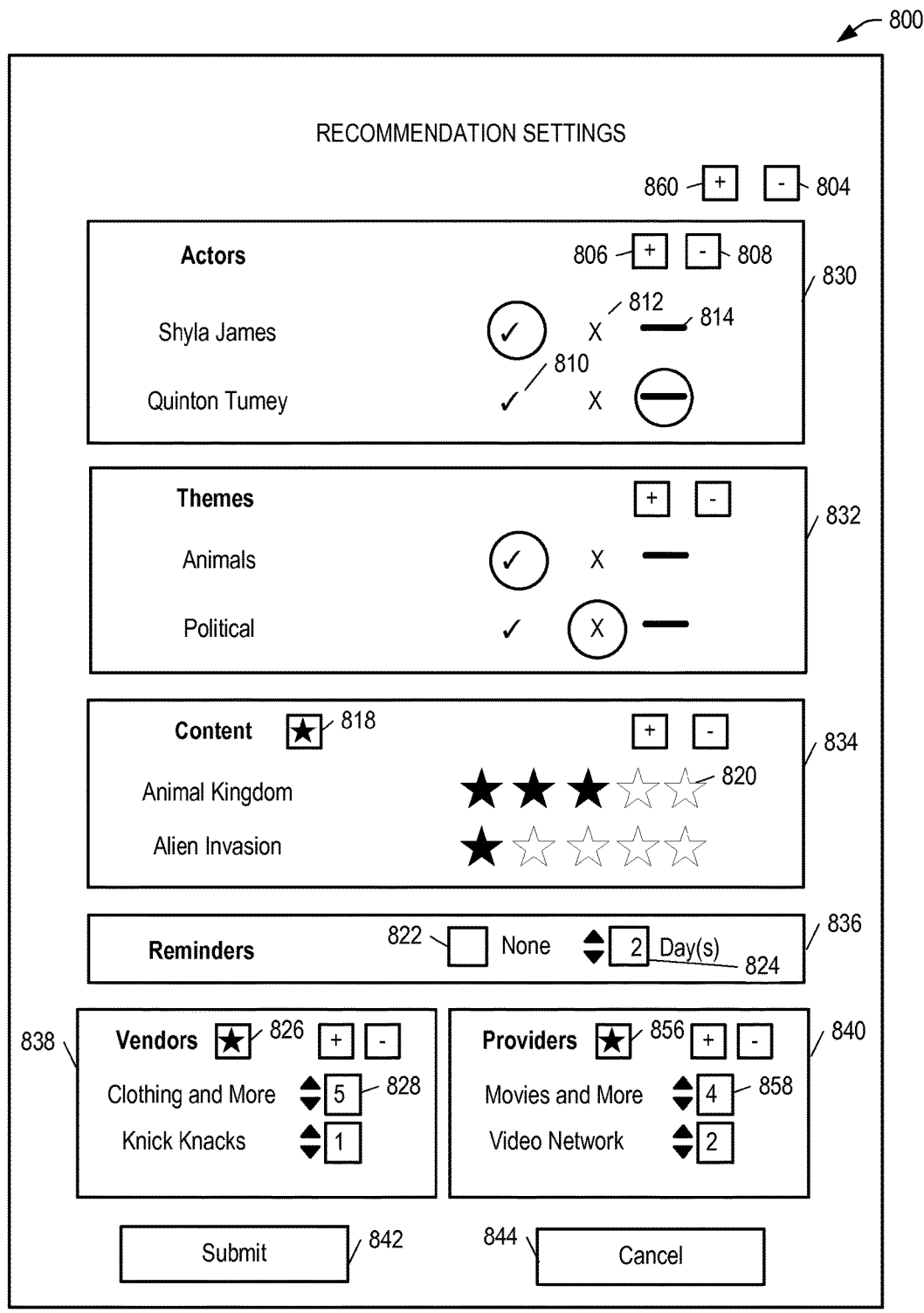
FIG. 8 is a diagram to illustrate a particular example of a recommendation options display of the system of FIG. 1.

Referring to FIG. 8, a diagram of a particular example of a recommendation options display of the system of FIG. 1 is illustrated and is generally designated 800. In an illustrative embodiment, one or more recommendation options may be selected via the recommendation settings display 800.

In the specific example illustrated in FIG. 8, the recommendation settings display 800 includes filters associated with an actors category (e.g., 830), a themes category (e.g., 832), and a content category (e.g., 834). The recommendation settings display 800 includes an add filter category option 860 and a remove filter category option 804. In other embodiments, the recommendation settings display 800 may include more, fewer, or different categories, filters, options, etc.

In response to a selection of the add filter category option 860, the recommendation settings display 800 may display an option to add filter(s) associated with one or more categories (e.g., genres, directors, producers, locations, costume designers, music, captions, languages, availability, image formats, choreographers, script writers, story writers, vendors, providers, etc.). In response to a selection of the remove filter category option 804, the recommendation settings display 800 may include an option to remove filters associated with one or more categories (e.g., 830, 832, 834, or a combination thereof).

The recommendation settings display 800 includes an add filter option 806 and a remove filter option 808 associated with each category. In response to a selection of the add filter option 806, the recommendation settings display 800 may include an option to add a filter associated with a particular category. For example, the user may select the add filter option 806 to add a particular actor filter (e.g., a Nathan Adams actor filter) within the actors filter category (i.e., 830). In response to a selection of the remove filter option 808, the recommendation settings display 800 may include an option to remove a particular filter associated with a particular category. For example, the user may select the remove filter option 808 to remove a particular actor filter (e.g., the Shyla James actor filter) within the actors filter category (i.e., 830).

The recommendation settings display 800 includes options to enter values associated with particular filters, update the values, or both. In a particular embodiment, the values of particular filters may be pre-populated based on filter values of the user profile 114. In the example illustrated in FIG. 8, the recommendation settings display 800 includes a positive feedback option (e.g., 810), a negative feedback option (e.g., 812), and a neutral feedback option (e.g., 814) associated each actor filter and each theme filter. A selected feedback option (i.e., 810, 812, or 814) may be displayed differently than non-selected feedback options. For example, the selected feedback option may be displayed with a distinguishing shape (e.g., circle, square, triangle, or rectangle), highlighting, font, color, etc.

The recommendation settings display 800 may include a content rating option 820 associated with each content filter. For example, the user may select a content rating for Animal Kingdom and another content rating for Alien Invasion.

The recommendation settings display 800 may include reminder options 836. The reminder options 836 may include a disable reminders option 822 to specify that reminders should not be sent. In addition, or in the alternative, the reminder options 836 may include an option 824 that may be used to specify a number of days before a time of interest that reminders should be sent.

The recommendation settings display 800 may include vendor options 838 and provider options 840. The vendor options 838 may include an option 828 to specify a priority associated with a particular vendor. In the specific example illustrated in FIG. 8, a priority of 5 is selected for a vendor Clothing and More and a priority of 1 is selected for a vendor Knick Knacks. The provider options 840 may include an option 858 to specify a priority associated with a particular provider. In the specific example illustrated in FIG. 8, a priority of 4 is selected for a provider Movies and More, and a priority of 2 is selected for a provider Video Network.

Although, tertiary (i.e., positive, negative, neutral), 5 star, and numeric values are illustrated, it is to be understood that other kinds of values (e.g., binary, decimal, textual, or a combination thereof) may be used to determine settings via the recommendation settings display 800 in other embodiments.

The recommendation settings display 800 may include options to update threshold values. For example, the recommendation settings display 800 may include a content rating threshold option 818, a vendor priority option 826, a provider priority option 856, or a combination thereof. In response to a selection of the content rating threshold option 818, the recommendation settings display 800 may include an option to specify a content rating threshold. A content rating threshold may be specified to receive recommendations associated with a content item based on whether that content item satisfies the content rating threshold. To illustrate, a particular content rating threshold (e.g., 2) may be selected.

As another example, the recommendation settings display 800 may include an option to specify a vendor priority threshold in response to a selection of the vendor priority option 826. A vendor priority threshold may be selected to receive recommendations of merchandise items of vendor(s) based on whether a corresponding vendor priority satisfies the vendor priority threshold. For example, a particular vendor priority threshold (e.g., 2) may be selected.

In a particular embodiment, the recommendation settings display 800 may include an option to specify a dynamic vendor priority. For example, the user may specify that vendors offering a particular promotion have a higher vendor priority than other vendors.

In a particular embodiment, the recommendation settings display 800 may include an option to specify an overall threshold value. For example, the overall threshold value may be imputed to each category. In a particular embodiment, the recommendation settings display 800 may display both an option to specify an overall threshold value and a category threshold value. For example, the overall threshold value may be imputed to each category for which a category threshold value is not specified.

The recommendation settings display 800 may include a cancel option 844 to exit the recommendation options display. A submit option 842 may be selected to send data (e.g., the recommendation options selection data 188 of FIG. 1) regarding the selections to the server 112. The profiler 102 may update the user profile 114 based on the selections.

Figure 9:
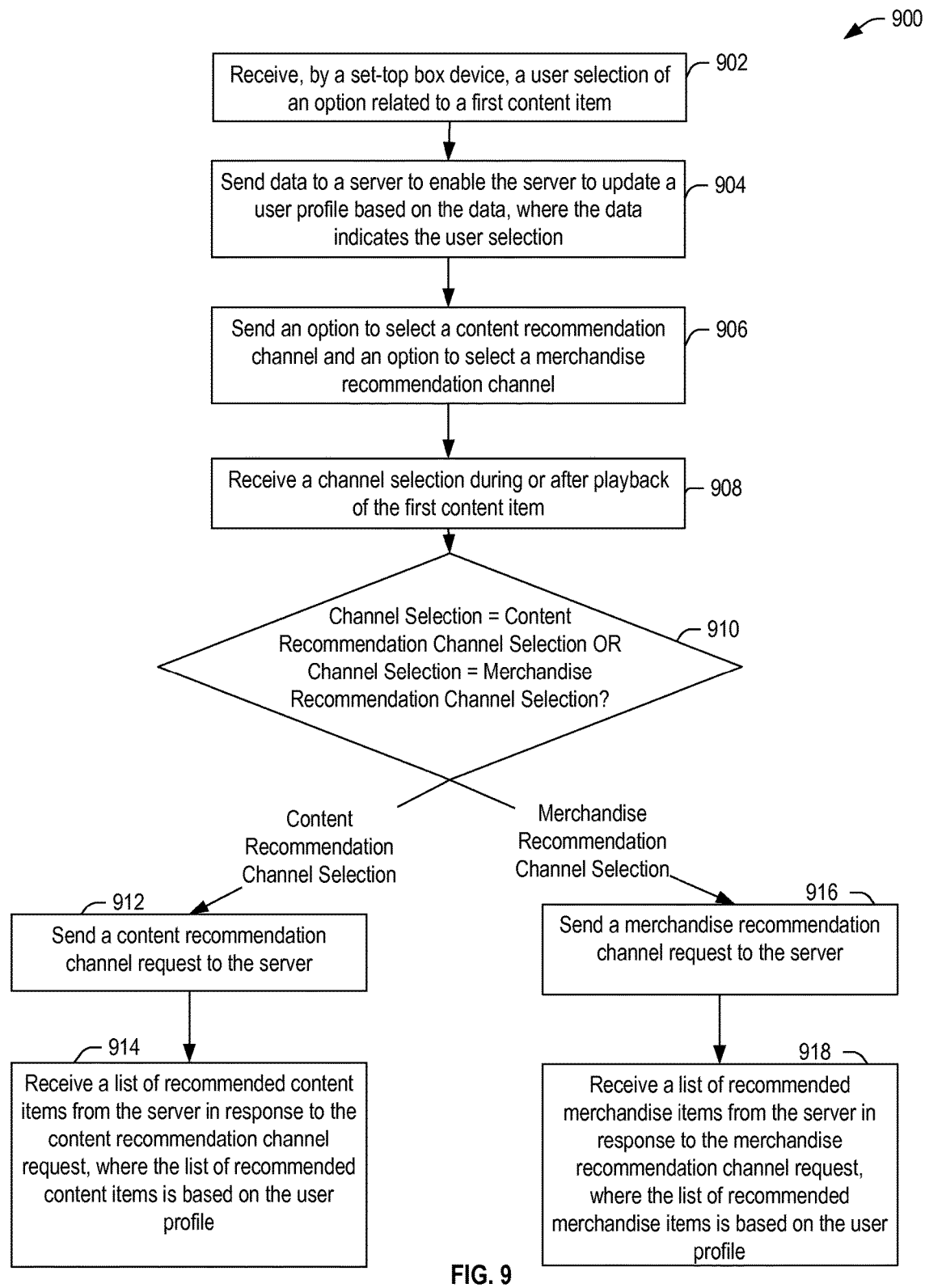
FIG. 9 is a flowchart to illustrate a particular embodiment of a method of recommending content, merchandise, or both.

FIG. 9 is a flowchart to illustrate a particular embodiment of a method 900 of recommending content, merchandise, or both. In an illustrative embodiment, the method 900 may be performed by the system 100 of FIG. 1 and may use one or more of the displays or options of FIGS. 2-8.

The method 900 may include receiving, by a set-top box device, a user selection of an option related to a first content item, at 902, and sending data to a server to enable the server to update a user profile based on the data, where the data indicates the user selection, at 904. For example, in FIG. 1, the set-top box device 134 may receive user input 190.

In a particular embodiment, the user input 190 may correspond to user selections made at a viewer feedback display. For example, a user may make a selection of a content rating 204 related to a content item 122 (e.g., a movie titled Animal Kingdom), may select an actor feedback (e.g., 208, 210, or 212) associated with each of one or more actors, and may select a submit option 214, as described with reference to FIG. 2.

The set-top box device 134 may receive the user input 190 corresponding to the user selections (e.g., via the remote control device 138). The set-top box device 134 may send the user feedback data 164 indicating the user selections to the server 112.

The method 900 may also include sending an option to select a content recommendation channel and an option to select a merchandise recommendation channel, at 906, and receiving a channel selection during or after playback of the first content item, at 908. For example, in FIG. 1, the set-top box device 134 may send a merchandise recommendation channel option and a content recommendation channel option via an EPG to the display device 136.

In a particular embodiment, the user input 190 may correspond to a selection of a channel option via the EPG. For example, a user may select the merchandise recommendation channel option 304 or select the content recommendation channel option 306 via the EPG display 300, as described with reference to FIG. 3. The set-top box device 134 may receive the user input 190 corresponding to the channel selection (e.g., via the remote control device 138).

The method 900 may further include determining whether the channel selection corresponds to a content recommendation channel selection or to a merchandise recommendation channel selection, at 910. For example, in FIG. 1, the set-top box device 134 may determine whether the channel selection corresponds to a selection of the merchandise recommendation channel option 304 or to a selection of the content recommendation channel option 306, as described with reference to FIG. 3.

The method 900 may also include, in response to determining that the channel selection corresponds to the content recommendation channel selection, sending a content recommendation channel request to the server, at 912, and receiving a list of recommended content items from the server in response to the content recommendation channel request, where the list of recommended content items is based on the user profile, at 914. For example, the set-top box device 134 may send the content recommendation channel request 182 to the server 112 in response to determining that the channel selection corresponds to a selection of the content recommendation channel option 306, as described with reference to FIG. 3.

The set-top box device 134 may receive the content items list 124 from the server 112 in response to the content recommendation channel request 182. The content items list 124 may be based on the user profile 114. In a particular embodiment, the content items list 124 may include recommended content items, as described with reference to FIG. 7.

Alternatively, the method 900 may further include, in response to determining that the channel selection corresponds to the merchandise recommendation channel selection, sending a merchandise recommendation channel request to the server, at 916, and receiving a list of recommended merchandise items from the server in response to the merchandise recommendation channel request, where the list of recommended merchandise items is based on the user profile, at 918. For example, the set-top box device 134 may send the merchandise recommendation channel request 184 to the server 112 in response to determining that the channel selection corresponds to a selection of the merchandise recommendation channel option 304, as described with reference to FIG. 3.

The set-top box device 134 may receive the merchandise items list 126 from the server 112 in response to the merchandise recommendation channel request 184. The merchandise items list 126 may be based on the user profile 114. In a particular embodiment, the merchandise items list 126 may include recommended merchandise items, as described with reference to FIG. 6.

Figure 10:
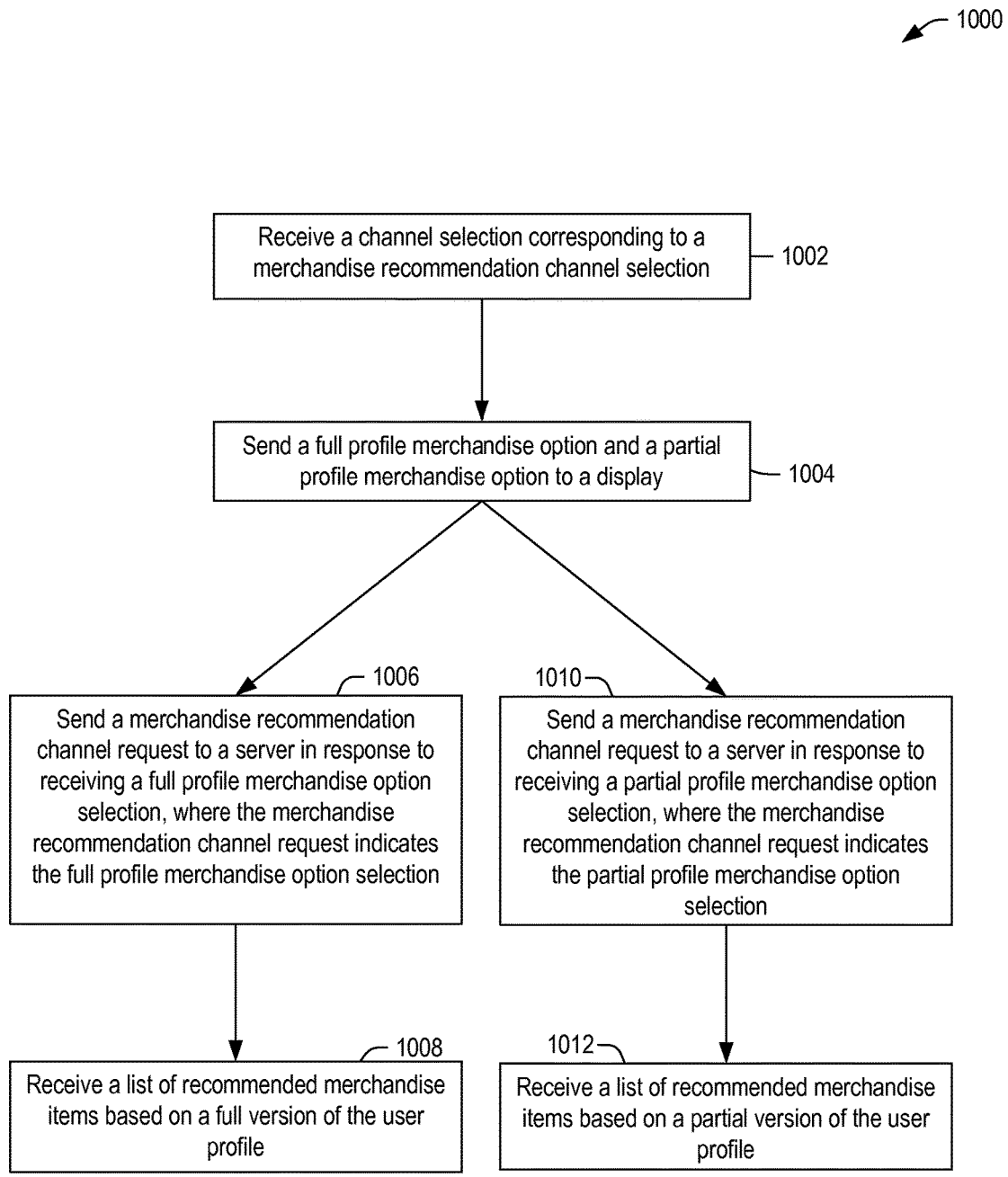
FIG. 10 is a flowchart to illustrate a particular embodiment of a method of recommending merchandise.

FIG. 10 is a flowchart to illustrate a particular embodiment of a method 1000 of recommending merchandise. In an illustrative embodiment, the method 1000 may be performed by the system 100 of FIG. 1 and may use one or more of the displays or options of FIGS. 2-4, 6, and 8.

The method 1000 may include receiving a channel selection corresponding to a merchandise recommendation channel selection, at 1002, and sending a full profile merchandise option and a partial profile merchandise option to a display, at 1004. For example, in FIG. 1, the set-top box device 134 may receive user input 190 corresponding to a selection of the merchandise recommendation channel option 304, as described with reference to FIG. 3.

The set-top box device 134 may send a full profile merchandise option and a partial profile merchandise option to the display device 136. In a particular embodiment, the set-top box device 134 may send a merchandise options display to the display device 136, as described with reference to FIG. 4.

The method 1000 may also include sending a merchandise recommendation channel request to a server in response to receiving a full profile merchandise option selection, where the merchandise recommendation channel request indicates the full profile merchandise option selection, at 1006, and receiving a list of recommended merchandise items based on a full version of the user profile, at 1008. For example, in FIG. 1, the set-top box device 134 may send the merchandise recommendation channel request 184 to the server 112 in response to the user input 190 including a selection of the full profile merchandise recommendation option 404, as described with reference to FIG. 4. The merchandise recommendation channel request 184 may indicate the selection of the full profile merchandise recommendation option 404 and the set-top box device 134 may receive the merchandise items list 126 based on a full version of the user profile 114, as described with reference to FIG. 4.

The method 1000 may further include sending a merchandise recommendation channel request to a server in response to receiving a partial profile merchandise option selection, where the merchandise recommendation channel request indicates the partial profile merchandise option selection, at 1010, and receiving a list of recommended merchandise items based on a partial version of the user profile, at 1012. For example, in FIG. 1, the set-top box device 134 may send the merchandise recommendation channel request 184 to the server 112 in response to the user input 190 including a selection of the partial profile merchandise recommendation option 406, as described with reference to FIG. 4. The merchandise recommendation channel request 184 may indicate the selection of the partial profile merchandise recommendation option 406 and the set-top box device 134 may receive the merchandise items list 126 based on a partial version of the user profile 114, as described with reference to FIG. 4.

Figure 11:
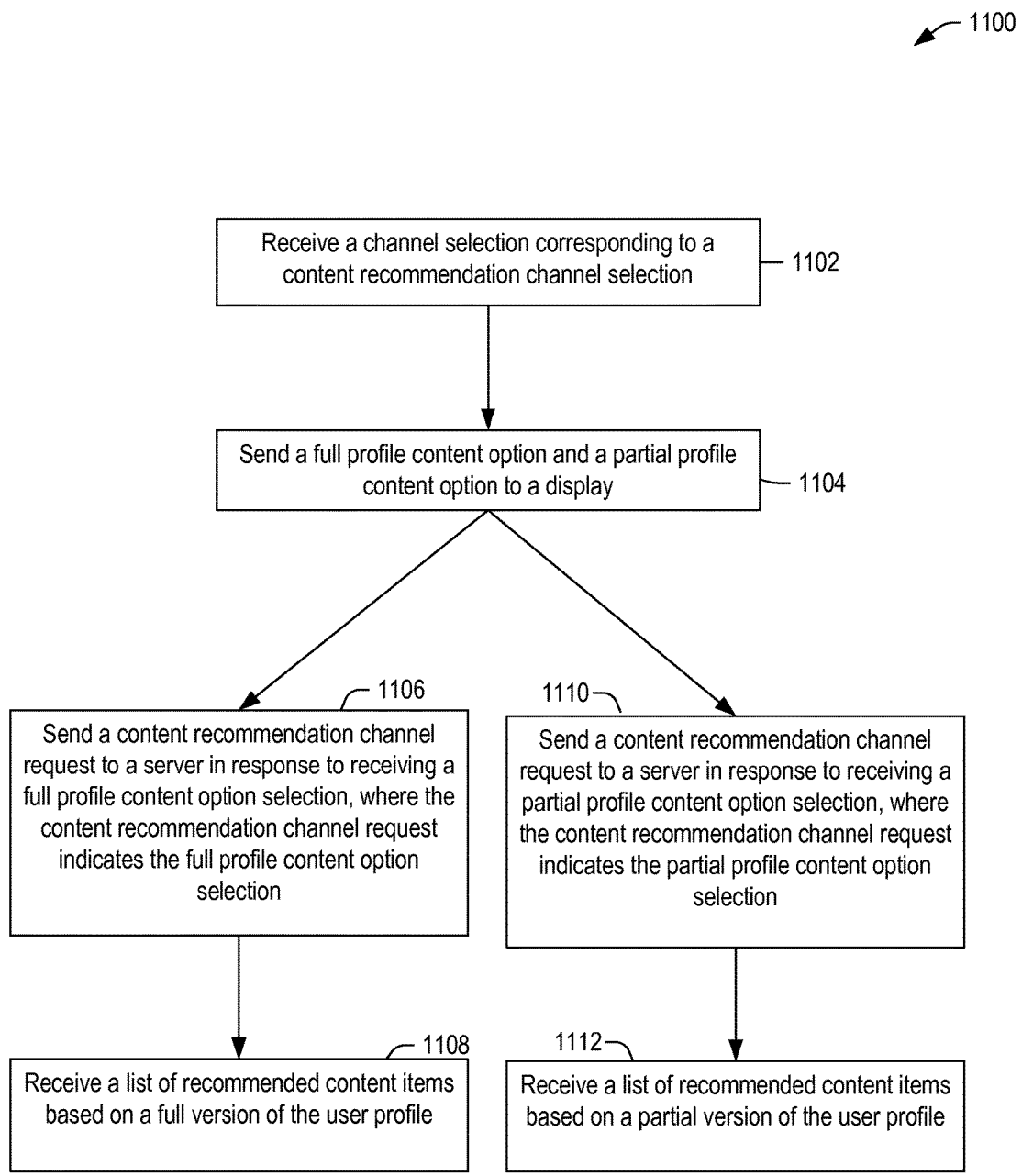
FIG. 11 is a flowchart to illustrate a particular embodiment of a method of recommending content.

FIG. 11 is a flowchart to illustrate a particular embodiment of a method 1100 of recommending content. In an illustrative embodiment, the method 1100 may be performed by the system 100 of FIG. 1 and may use one or more of the displays or options of FIGS. 2-3, 5, and 7-8.

The method 1100 may include receiving a channel selection corresponding to a content recommendation channel selection, at 1102, and sending a full profile content option and a partial profile content option to a display, at 1104. For example, in FIG. 1, the set-top box device 134 may receive user input 190 corresponding to a selection of the content recommendation channel option 306, as described with reference to FIG. 3.

The set-top box device 134 may send a full profile content option and a partial profile content option to the display device 136. In a particular embodiment, the set-top box device 134 may send a content options display to the display device 136, as described with reference to FIG. 5.

The method 1100 may also include sending a content recommendation channel request to a server in response to receiving a full profile content option selection, where the content recommendation channel request indicates the full profile content option selection, at 1106, and receiving a list of recommended content items based on a full version of the user profile, at 1108. For example, in FIG. 1, the set-top box device 134 may send the content recommendation channel request 182 to the server 112 in response to the user input 190 including a selection of the full profile content recommendation option 504, as described with reference to FIG. 5. The content recommendation channel request 182 may indicate the selection of the full profile content recommendation option 504 and the set-top box device 134 may receive the content items list 124 based on a full version of the user profile 114, as described with reference to FIG. 5.

The method 1100 may further include sending a content recommendation channel request to a server in response to receiving a partial profile content option selection, where the content recommendation channel request indicates the partial profile content option selection, at 1110, and receiving a list of recommended content items based on a partial version of the user profile, at 1112. For example, in FIG. 1, the set-top box device 134 may send the content recommendation channel request 182 to the server 112 in response to the user input 190 including a selection of the partial profile content recommendation option 506, as described with reference to FIG. 5. The content recommendation channel request 182 may indicate the selection of the partial profile content recommendation option 506 and the set-top box device 134 may receive the content items list 124 based on a partial version of the user profile 114, as described with reference to FIG. 5.

Figure 12:
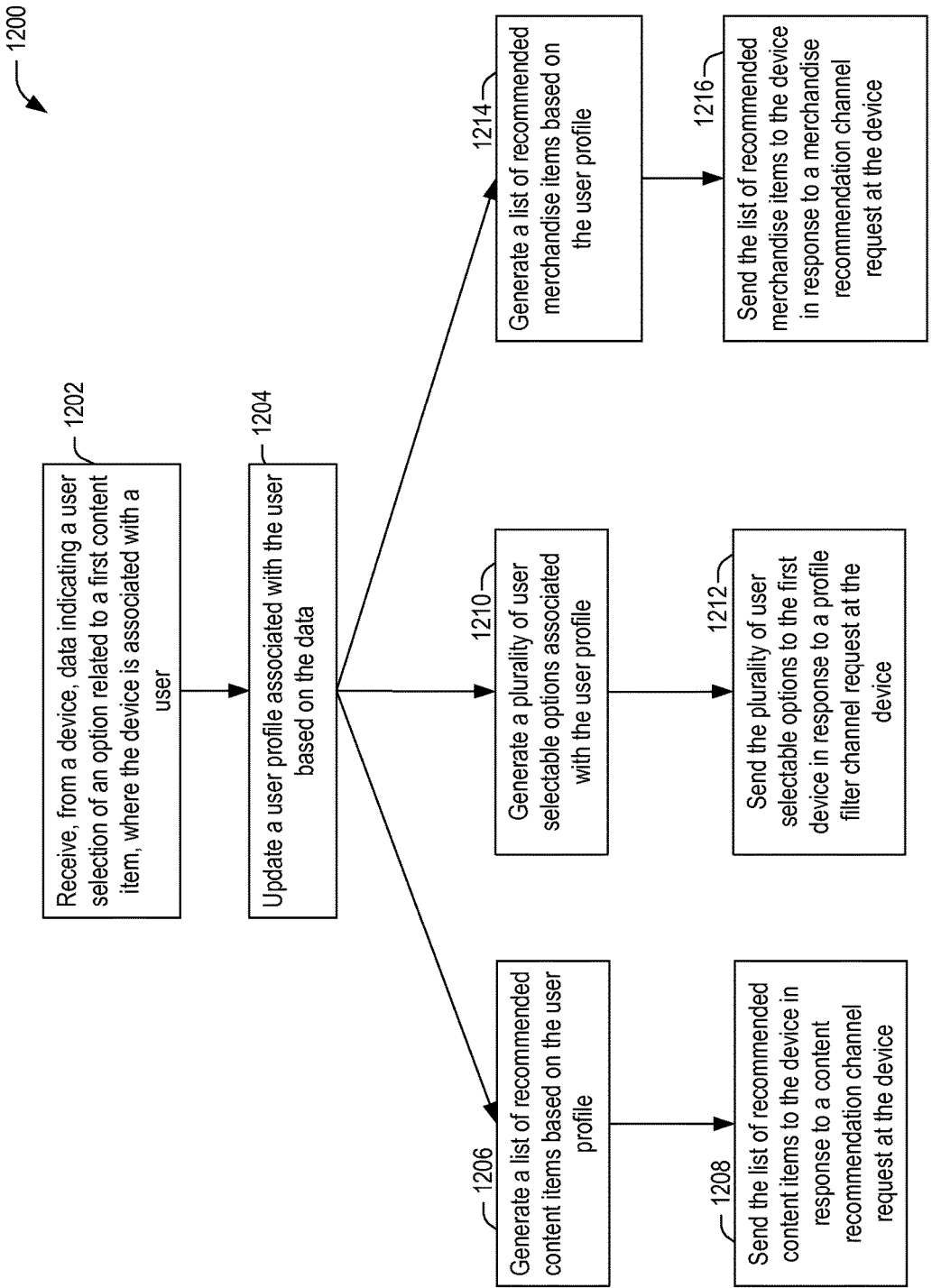
FIG. 12 is a flowchart to illustrate another particular embodiment of a method of recommending content, merchandise, or both.

FIG. 12 is a flowchart to illustrate another particular embodiment of a method 1200 of recommending content, merchandise, or both. In an illustrative embodiment, the method 1100 may be performed by the system 100 of FIG. 1 and may use one or more of the displays or options of FIGS. 2-8.

The method 1200 may include receiving, from a device, data indicating a user selection of an option related to a first content item, where the device is associated with a user, at 1202, and updating a user profile associated with the user based on the data, at 1204. For example, in FIG. 1, the server 112 may receive, from the set-top box device 134, the user feedback data 164 indicating a user selection of an option related to the content item 122, and the profiler 102 may update the user profile 114 based on the user feedback data 164.

In a particular embodiment, the server 112 may receive, from the set-top box device 134, user feedback data 164 corresponding to selections of the viewer feedback display 200 related to the content item 122 (e.g., a movie titled Animal Kingdom), as described with reference to FIG. 2. The user feedback data 164 may include a selection of the content rating 204, the actor feedback (e.g., 208, 210, or 212), or both. The profiler 102 may update the user profile 114 to indicate the content rating 204 and the actor feedback (i.e., 208, 210, or 212) selections, as described with reference to FIG. 1.

The method 1200 may also include generating a list of recommended content items based on the user profile, at 1206, and sending the list of recommended content items to the device in response to a content recommendation channel request at the device, at 1208. For example, in FIG. 1, the content recommendation engine 104 may generate the content items list 124 based on the user profile 114 and send the content items list 124 to the set-top box device 134. In a particular embodiment, the content items list 124 may correspond to content recommendations display 700, as described with reference to FIG. 7.

The method 1200 may further include generating a plurality of user selectable options associated with the user profile, at 1210, and sending the plurality of user selectable options to the device in response to a recommendation settings channel request at the device, at 1212. For example, in FIG. 1, the profiler 102 may generate the recommendation options 128 associated with the user profile 114 and may send the recommendation options 128 to the set-top box device 134. In a particular embodiment, the recommendation options 128 may correspond to recommendation settings display 800, as described with reference to FIG. 8.

The method 1200 may also include generating a list of recommended merchandise items based on the user profile, at 1214, and sending the list of recommended merchandise items to the device in response to a merchandise recommendation channel request at the device, at 1216. For example, in FIG. 1, the merchandise recommendation engine 106 may generate the merchandise items list 126 based on the user profile 114 and send the merchandise items list 126 to the set-top box device 134. In a particular embodiment, the merchandise items list 126 may correspond to merchandise recommendations display 600, as described with reference to FIG. 6.

Figure 13:
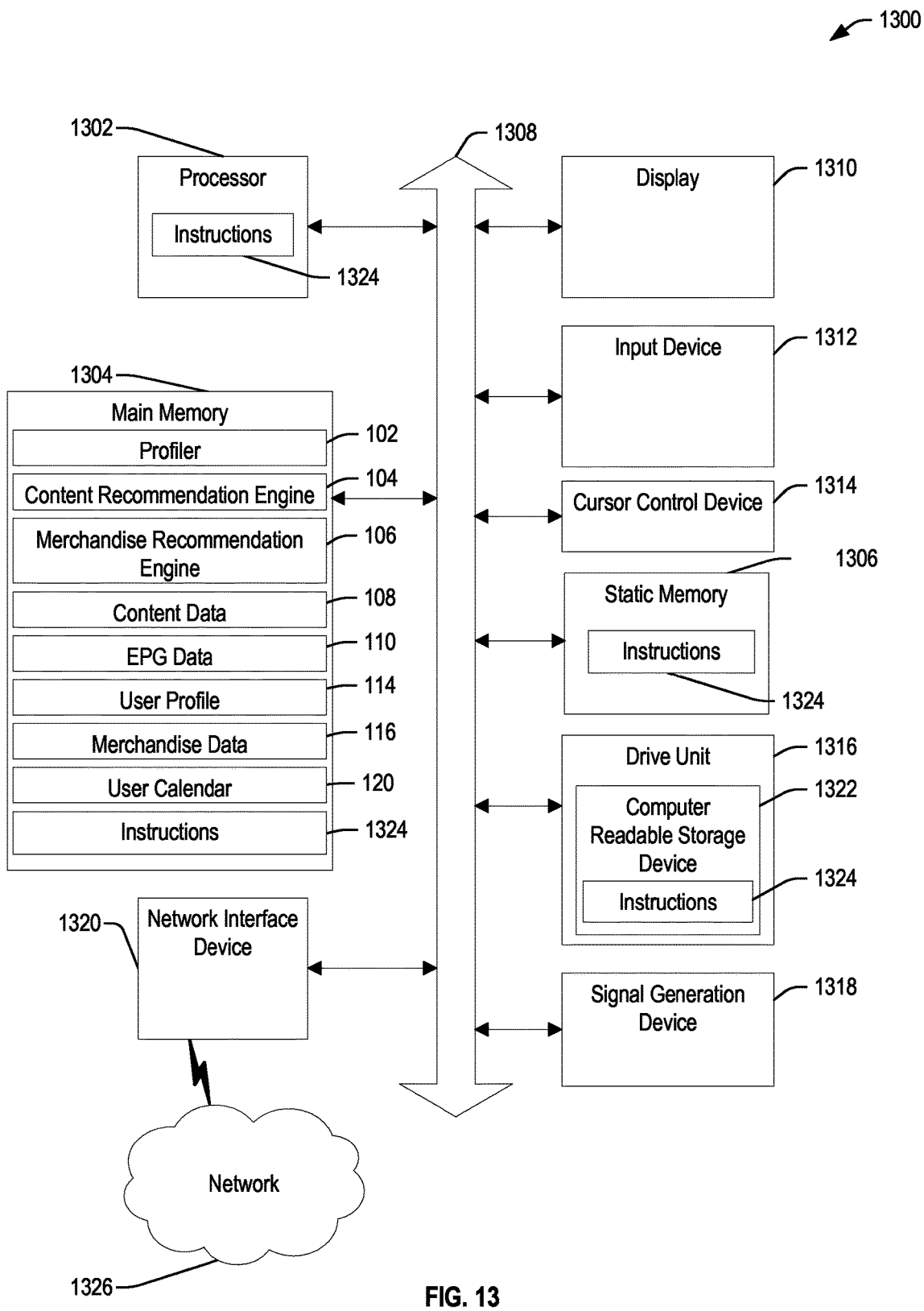
FIG. 13 is a block diagram of an illustrative embodiment of a general computer system operable to support embodiments of computer-implemented methods, computer program products, and system components as illustrated in FIGS. 1-12.

FIG. 13 is a block diagram illustrates an embodiment of a general computer system that is generally designated 1300. The computer system 1300 may be operable to support embodiments of computer-implemented methods, computer program products, and system components as illustrated in FIGS. 1-12. The computer system 1300, or any portion thereof, may operate as a standalone device or may be connected, e.g., using a network, to other computer systems or peripheral devices.

In a networked deployment, the computer system 1300 may operate in the capacity of a set-top box device, a personal computing device, a mobile computing device, or some other computing device. The computer system 1300 can also be implemented as or incorporated into various devices, such as a personal computer (PC), a tablet PC, a personal digital assistant (PDA), a mobile device, a palmtop computer, a laptop computer, a desktop computer, a communications device, a web appliance, a television or other display device, or any other machine capable of executing a set of instructions (sequential or otherwise) that specify actions to be taken by that machine. In a particular embodiment, the computer system 1300 can be implemented using electronic devices that provide voice communication, video communication, data communication, or a combination thereof. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 13, the computer system 1300 may include a processor 1302, e.g., a central processing unit (CPU). Moreover, the computer system 1300 may include a main memory 1304 and a static memory 1306 that may communicate with each other via a bus 1308. In a particular embodiment, the main memory 1304 may include (e.g., as processor-executable instructions or data) the profiler 102 of FIG. 1, the content recommendation engine 104 of FIG. 1, the merchandise recommendation engine 106 of FIG. 1, the content data 108 of FIG. 1, the EPG Data 110 of FIG. 1, the user profile 114 of FIG. 1, the merchandise data 116 of FIG. 1, the user calendar 120 of FIG. 1, or any combination thereof. As shown, the computer system 1300 may further include or be coupled to a display unit 1310, such as a liquid crystal display (LCD), an organic light emitting diode (OLED), a flat panel display, a solid-state display, or a projection display. Additionally, the computer system 1300 may include an input device 1312, such as a keyboard, a remote control device, and a cursor control device 1314, such as a mouse. In a particular embodiment, the cursor control device 1314 may be incorporated into a remote control device, such as the remote control device 138 of FIG. 1. The computer system 1300 may also include a disk drive unit 1316, a signal generation device 1318, such as a speaker, and a network interface device 1320. The network interface device 1320 may be coupled to other devices (not shown) via a network 1326, such as the network 130 of FIG. 1, the content acquisition network 150 of FIG. 1, or any combination thereof.

One or more of the components of the computer system 1300 may be included in a set-top box device (e.g. the set-top box device 134), a mobile device (e.g., the mobile device 142), or a computing device (e.g., the computing device 140). In a particular embodiment, the set-top box device, the mobile device, or the computing device may include a tangible computer-readable medium in which one or more sets of instructions, e.g., software, may be embedded. Further, the instructions may be executable by a processor to perform one or more of the methods described herein.

In a particular embodiment, as depicted in FIG. 13, the disk drive unit 1316 may include a tangible computer-readable storage device 1322 in which one or more sets of instructions 1324, e.g. software, may be embedded. Further, the instructions 1324 may embody one or more of the methods or logic as described herein. In a particular embodiment, the instructions 1324 may reside completely, or at least partially, within the main memory 1304, the static memory 1306, and/or within the processor 1302 during execution by the computer system 1300. The main memory 1304 and the processor 1302 also may include tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limiting embodiment, implementations can include distributed processing and parallel processing. Alternatively, virtual computer system processing can be used to implement one or more of the methods or functionality as described herein.

The present disclosure describes a computer-readable non-transitory medium that includes instructions 1324 so that a device connected to the network 1326 can communicate voice, video, or data over the network 1326. Further, the instructions 1324 may be transmitted or received over the network 1326 via the network interface device 1320 (e.g., via uploading and/or downloading of a merchandise recommendation application or program, a content recommendation application or program, or both).

While the computer-readable non-transitory medium is shown to be a single medium, the term "computer-readable medium" includes a single medium or multiple media, such as a centralized or distributed database, and/or associated caches and servers that store one or more sets of instructions. The term "non-transitory computer-readable medium" shall also include any medium that is capable of storing a set of instructions for execution by a processor or that cause a computer system to perform any one or more of the methods or operations disclosed herein.

In a particular non-limiting, exemplary embodiment, the computer-readable non-transitory medium can include a solid-state memory such as a memory card or other package that houses one or more non-volatile read-only memories. Further, the computer-readable non-transitory medium can be a random access memory or other volatile re-writable memory. Additionally, the computer-readable non-transitory medium can include a magneto-optical or optical medium, such as a disk or tapes. Accordingly, the disclosure is considered to include any one or more of a computer-readable non-transitory storage medium and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories.

Although the present specification describes components and functions that may be implemented in particular embodiments with reference to particular standards and protocols, the disclosure is not limited to such standards and protocols. For example, standards for Internet, other packet switched network transmission and standards for viewing media content (e.g. MPEG and H.264) represent examples of the state of the art. Such standards are periodically superseded by faster or more efficient equivalents having essentially the same functions. Accordingly, replacement standards and protocols having the same or similar functions as those disclosed herein are considered equivalents thereof.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a user device, first input corresponding to selection of a recommendation option of an electronic program guide;
sending, from the user device to a display device, a first option to base a media content recommendation on a subset of a plurality of previously displayed media content items and a second option to base the media content recommendation on the plurality of previously displayed media content items, wherein the subset of the plurality of previously displayed media content items is a nonempty proper subset of the plurality of previously displayed media content items;
receiving, at the user device, second input that indicates the first option;
in response to receiving the second input, sending a request from the user device to a server, wherein the request includes an identifier based on the first option; and
receiving information corresponding to a recommended media content item at the user device in response to the request, wherein the recommend media content item is selected based on the subset of the plurality of previously displayed media content items.

2. The method of claim 1, further comprising:
receiving, at the user device, third input corresponding to selection of the recommendation option of the electronic program guide;
sending, from the user device to the display device, a third option to base a second media content recommendation on the subset of the plurality of previously displayed media content items and a fourth option to base the second media content recommendation on the plurality of previously displayed media content items;
receiving, at the user device, fourth input that indicates the fourth option;
in response to receiving the fourth input, sending a second request to the server, wherein the second request includes a second identifier based on the fourth option; and
receiving second information corresponding to a second recommended media content item at the user device in response to the request, wherein the second recommended media content item is selected based on a particular previously displayed media content item of the plurality of previously displayed media content items, and wherein the particular previously displayed media content item is not included in the subset of the plurality of previously displayed media content items.

3. The method of claim 1, further comprising:
receiving, at the user device, third input corresponding to selection of a merchandise recommendation option of the electronic program guide;
sending, from the user device to the display device, a third option to base a merchandise recommendation on the subset of the plurality of previously displayed media content items and a fourth option to base the merchandise recommendation on the plurality of previously displayed media content items;
receiving, at the user device, fourth input that indicates the third option or the fourth option;
sending a second request to the server, wherein the second request includes a second identifier based on the fourth input; and
receiving second information corresponding to recommended merchandise items in response to the second request.

4. The method of claim 3, further comprising sending a list of recommended merchandise items generated from the second information to the display device.

5. The method of claim 1, further comprising sending a list of recommended media content items generated from the information to the display device.

6. The method of claim 1, wherein the subset of the plurality of previously displayed media content items is a singleton set including a most recently displayed media content item.

7. The method of claim 1, further comprising, during playback of particular media content, sending rating data about the particular media content to the server.

8. The method of claim 7, wherein the rating data includes explicit input received from a viewer, implicit input, or both.

9. The method of claim 8, wherein the implicit input includes a play time of the particular media content.

10. A computer-readable storage device comprising instructions executable by a processor to perform operations including:
- receiving first input corresponding to selection of a recommendation option of an electronic program guide;
- sending, to a display device, a first option to base a media content recommendation on a subset of a plurality of previously displayed media content items and a second option to base the media content recommendation on the plurality of previously displayed media content items, wherein the subset of the plurality of previously displayed media content items is a nonempty proper subset of the plurality of previously displayed media content items;
- receiving second input that indicates the first option;
- in response to receiving the second input, sending a request to a server, wherein the request includes an identifier based on the first option; and
- receiving information corresponding to a recommended media content item in response to the request, wherein the recommend media content item is selected based on the subset of the plurality of previously displayed media content items.

11. The computer-readable storage device of claim 10, wherein the operations further include displaying the electronic program guide in response to an electronic program guide request.

12. A system comprising:
- a processor; and
- a memory coupled to the processor, the memory including instructions executable by the processor to perform operations including:
  - receiving a media content recommendation request from a device associated with a user; and
  - in response to the media content recommendation request, generating a first list of recommended media content, wherein an identifier in the media content recommendation request indicates that the first list is based on first data in a user profile associated with the user, the first data corresponding to a subset of a plurality of previously displayed media content items, wherein the subset of the plurality of previously displayed media content items is a nonempty proper subset of the plurality of previously displayed media content items.

13. The system of claim 12, wherein the operations further include:
- receiving a second media content recommendation request from the device; and
- in response to the second media content recommendation request, generating a second list of recommended media content, wherein a second identifier in the second media content recommendation request indicates that the second list is based on second data corresponding to the plurality of previously displayed media content items.

14. The system of claim 13, wherein the operations include:
- receiving rating data corresponding to a rating for particular media content from a particular device associated with the user; and
- updating the user profile so that the first data is associated with the rating data and the second data is adjusted based on the rating data.

15. The system of claim 13, wherein the operations include:
- receiving a merchandise recommendation request from a particular device associated with the user; and
- in response to the merchandise recommendation request, generating a third list of recommended merchandise, wherein a third identifier in the merchandise recommendation request determines whether the third list is based on the first data or the second data.

16. The system of claim 15, wherein the operations further include sending the third list to the particular device.

17. The system of claim 15, wherein an item included in the third list corresponds to a performance ticket, a movie ticket, a venue ticket, a physical asset, an electronic asset, a hotel reservation, a rental car reservation, a flight reservation, a vacation package, or a combination thereof.

18. The system of claim 12, wherein the operations include:
- generating a plurality of user selectable options associated with the user profile; and
- sending the plurality of user selectable options to a particular device associated with the user in response to a recommendation settings request received from the particular device.

19. The system of claim 12, wherein the first list includes a first media content item provided by a first content provider and a second media content item provided by a second content provider.

20. The system of claim 19, wherein the user profile indicates a priority associated with each content provider, and wherein the first list is sorted based on the priority of each content provider.

* * * * *